US008953868B2

(12) United States Patent
Murakami et al.

(10) Patent No.: US 8,953,868 B2
(45) Date of Patent: Feb. 10, 2015

(54) DEFECT INSPECTION METHOD AND DEFECT INSPECTION APPARATUS

(71) Applicant: Hitachi High-Technologies Corporation, Tokyo (JP)

(72) Inventors: Shinya Murakami, Kawasaki (JP); Chie Shishido, Kawasaki (JP); Takashi Hiroi, Yokohama (JP); Taku Ninomiya, Hitachinaka (JP); Tsuyoshi Minakawa, Yokohama (JP); Atsushi Miyamoto, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 63 days.

(21) Appl. No.: 13/905,164

(22) Filed: May 30, 2013

(65) Prior Publication Data

US 2013/0322737 A1    Dec. 5, 2013

(30) Foreign Application Priority Data

May 30, 2012    (JP) ................................. 2012-122637

(51) Int. Cl.
*G06K 9/00* (2006.01)
*G06T 7/00* (2006.01)

(52) U.S. Cl.
CPC ....... *G06T 7/001* (2013.01); *G06T 2207/10061* (2013.01); *G06T 2207/30148* (2013.01)
USPC .............................. 382/141; 438/16; 348/126

(58) Field of Classification Search
CPC ................... G06T 7/0004; G06T 2207/30108; G06T 7/0002; H01L 22/10; H01L 22/12; H01L 21/02104; H01L 21/30625; H01L 21/67023; H01L 22/14; H01L 27/14643; H01L 31/18; H01L 33/30; G01B 11/24; G01B 11/002

USPC ......... 382/100, 141, 144, 145, 146, 147, 148, 382/149, 150, 151, 152, 217–222; 438/16; 348/92, 125, 126, 135
See application file for complete search history.

(56) References Cited

U.S. PATENT DOCUMENTS 7,123,356 B1 * 10/2006 Stokowski et al. ......... 356/237.2
7,457,455 B2 * 11/2008 Matsui et al. ................. 382/149
7,616,805 B2 * 11/2009 Matsui et al. ................. 382/149
7,639,863 B2 * 12/2009 Isomura ....................... 382/144

(Continued)

FOREIGN PATENT DOCUMENTS

JP    2004-185019    7/2004

*Primary Examiner* — Anand Bhatnagar
(74) *Attorney, Agent, or Firm* — Antonelli, Terry, Stout & Kraus, LLP.

(57) ABSTRACT

A defect inspection method comprising: picking up an image of a subject under inspection to thereby acquire an inspection image; extracting multiple templates corresponding to multiple regions, respectively from design data of the subject under inspection; finding a first misregistration amount between the inspection image and the design data using a first template as any one template selected from among the plural templates; finding a second misregistration amount between the inspection image and the design data using a second template other than the first template, the second template being selected from among the plural templates, and the first misregistration-amount; and converting the design data, misregistration thereof being corrected using the first misregistration-amount, and the second misregistration-amount, into a design data image, and comparing the design data image with the inspection image to thereby detect a defect of the subject under inspection.

18 Claims, 27 Drawing Sheets

(56) References Cited

U.S. PATENT DOCUMENTS

| | | | |
|---|---|---|---|
| 7,729,529 B2 * | 6/2010 | Wu et al. | 382/149 |
| 8,041,103 B2 * | 10/2011 | Kulkarni et al. | 382/144 |
| 8,139,843 B2 * | 3/2012 | Kulkarni et al. | 382/144 |
| 8,213,704 B2 * | 7/2012 | Peterson et al. | 382/145 |
| 8,355,562 B2 * | 1/2013 | Toyoda et al. | 382/149 |
| 2007/0230770 A1 * | 10/2007 | Kulkarni et al. | 382/149 |
| 2009/0041335 A1 * | 2/2009 | Matsui et al. | 382/149 |
| 2010/0021041 A1 * | 1/2010 | Matsui et al. | 382/141 |
| 2010/0119144 A1 * | 5/2010 | Kulkarni et al. | 382/149 |

* cited by examiner

603 —— LONGITUDINAL EDGE
604 ----- TRANSVERSE EDGE

FIG.9

| | | |
|---|---|---|
| FIRST STAGE | TEMPLATE SIZE [nm] | 500,500 |
| | UNIQUENESS SEARCH SCOPE [nm] | 1000 |
| | ARRAY SIZE [nm] | 600 |
| SECOND STAGE ☑ | TEMPLATE SIZE [nm] | 150,150 |
| | UNIQUENESS SEARCH SCOPE [nm] | 300 |
| | ARRAY SIZE [nm] | 180 |
| THIRD STAGE ☐ | TEMPLATE SIZE [nm] | 50,50 |
| | UNIQUENESS SEARCH SCOPE [nm] | 80 |
| | ARRAY SIZE [nm] | 60 |

SAVE   LOAD

———— UPWARD EDGE
≡≡≡≡ DOWNWARD EDGE
------ LEFTWARD EDGE
-- -- -- RIGHTWARD EDGE

DEFECT INSPECTION METHOD AND DEFECT INSPECTION APPARATUS

TECHNICAL FIELD

The present invention relates to a defect inspection method and a defect inspection apparatus.

BACKGROUND

As a result of the miniaturization of a semiconductor circuit pattern, the resolution of a semiconductor exposure apparatus has reached the limitations thereof, so that it is getting difficult to form a designed pattern on a wafer. There has been an increase in the incidence of a systematic defect such as a deviation in pattern-line (trace) width from a design value, or a change in the shape of a pattern tip. As occurrence of the systematic defect is in common with all the dies, it has been difficult to detect a defect by a die to die (or referred to as D2D) inspection whereby a defect is inspected by comparison of a die under inspection with a die adjacent thereto, this inspection representing the technique according to the prior art. Accordingly, there has been an increase in the need for a die to database (or referred to as D2DB) inspection whereby a defect is inspected by comparison of a die under inspection with the design data.

In Japanese Unexamined Patent Application Publication No. 2004-185019, there is disclosed an inspection method whereby an inspection region is divided in an array-like fashion to determine whether or not respective array regions include a pattern capable of registration from design data, registration is executed starting from an array region capable of registration after acquisition of an actual image, and the result of registration of a nearby array capable of registration is applied to an array region incapable of registration to thereby carry out inspection.

SUMMARY

Misregistration occurs to an inspection image (an actual SEM image) acquired by, for example, an SEM inspection apparatus, the misregistration representing a difference between an image-pickup position as intended by the defect inspection apparatus and an actual image-pickup position. Even in the case where processing for comparison of the inspection image with design data is executed in the D2DB comparison to thereby detect a defect, a problem exists in that accuracy in defect-detection deteriorates under the influence of the misregistration. As the cause of the misregistration, there are cited a distortion due to an electron beam scanning, a distortion due to electrostatic charging of a wafer, a distortion accompanying rocking occurring at the time of scanning the stage, and so forth, besides an error of the system, attributable to an error in a travelling amount at the time of scanning the stage with the wafer placed thereon.

With the method according to Japanese Unexamined Patent Application Publication No. 2004-185019, mention is made of nothing but the misregistration due to the error of the system, attributable to the error in the travelling amount at the time of scanning the stage with the wafer placed thereon, so that no disclosure has been made of a method for correcting misregistration caused by the distortion due to the electron beam scanning, the distortion due to the electrostatic charging of the wafer, the distortion accompanying the rocking occurring at the time of scanning the stage, and so forth. Further, a method for determining optimum sizes of an array, and a pattern, respectively, for use in registration, and a pattern suitable for the registration, according to magnitude of misregistration, and frequency, has not been taken into consideration.

It is therefore an object of the invention to provide a defect inspection method, and a defect inspection apparatus, capable of implementing highly accurate defect-detection by comparative inspection.

To that end, according to one aspect of the present invention, there is provided a defect inspection method having an inspection image acquisition step for picking up an image of a subject under inspection to thereby acquire an inspection image, a template extraction step for extracting multiple templates corresponding to multiple regions, respectively, from design data of the subject under inspection, a first misregistration-amount calculating step for finding the first misregistration-amount between the inspection image and the design data using a first template as any one template selected from among the plural templates, a second misregistration-amount calculating step for finding the second misregistration-amount between the inspection image and the design data using a second template other than the first template, the second template being selected from among the plural templates, and the first misregistration-amount, and a defect-inspection step for converting the design data, misregistration thereof being corrected using the first misregistration-amount, and the second misregistration-amount, into a design data image, and comparing the design data image with the inspection image to thereby detect a defect of the subject under inspection.

The present invention can provide a defect inspection method, and a defect inspection apparatus, capable of implementing highly accurate defect-detection by comparative inspection.

BRIEF DESCRIPTION OF THE DRAWINGS

FIG. 9 shows an example of a GUI for setting a parameter for use in extracting the template, according to the first embodiment of the invention:

DETAILED DESCRIPTION

First Embodiment

An overall configuration according to a first embodiment of the invention is described hereinafter, and subsequently, the contents of respective processes are sequentially described.

(1-1) General Flow

Figure 2:
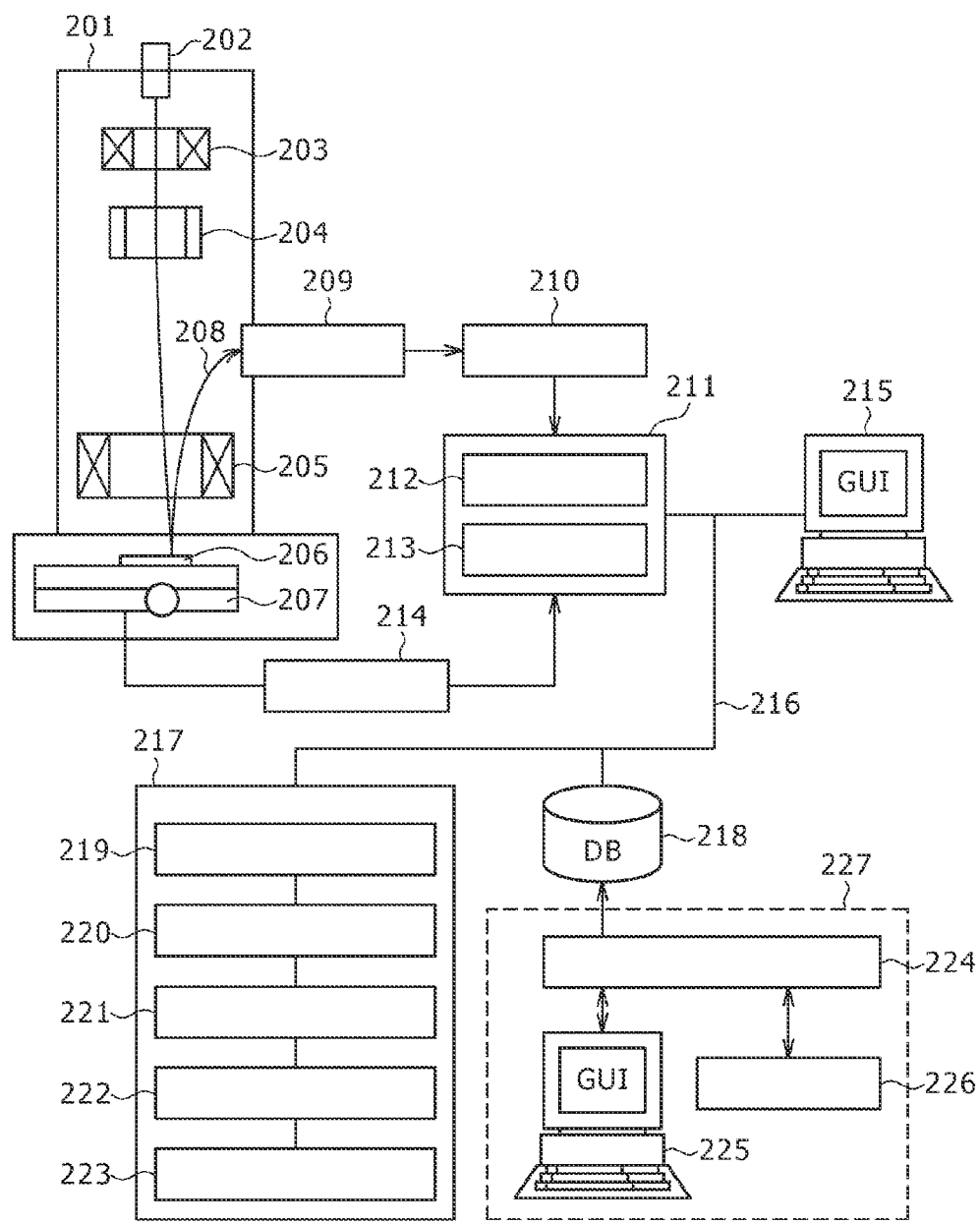
FIG. 2 is a view showing the system configuration of a defect inspection apparatus according to the first embodiment of the invention.

FIG. 2 is a view showing a system configuration of a defect inspection apparatus according to the first embodiment of the invention.

With the present embodiment, an image of an inspection-target part of a wafer 206, that is, a subject under inspection is acquired using, for example, a scanning electron microscope (SEM).

The defect inspection apparatus is comprised of an electron optical system 201, a control unit (211, 214, 215, 216), a comparative inspection unit 217, a DB 218, and a template 227.

The electron optical system 201 is provided with an electron source 202, a condenser lens 203, a deflector 204, an objective lens 205, an XY-stage 207, a detector 209, and an A/D converter 210.

The control unit includes an inspection controller 211 (CPU 212, an image memory 213), a stage controller 214, a GUI 215, and a bus 216.

The comparative inspection unit 217 is provided with a design-data processing sub-unit 219, a matching processing sub-unit 220, a pattern-deformation processing sub-unit 221, a defect-determination processing sub-unit 222, and an inspection-image processing sub-unit 223.

The template 227 is provided with a template extraction processor 224, characteristics data 226, and a GUI 225.

An electron beam emitted from the an electron source 202 of the electron optical system 201 is converged by the condenser lens 203 to be deflected in XY directions by the deflector 204, subsequently, travelling through the objective lens 205 to irradiate the surface of the wafer 206.

The detector 209 detects a secondary election 208 generated from the wafer 206, and the secondary election 208 detected by the detector 209 is converted from an analog signal to a digital signal by the A/D converter 210.

The stage controller 214 controls the movement of the XY-stage 207, and a series of these inspection-process steps are under control by the CPU 212.

The digital signals converted by the A/D converter 210 are accumulated in the image memory 213 of the inspection controller 211, and the GUI 215 displays an inspection result, or receives an input of information from a user.

In this case, a continuous image acquired by one-dimensional scanning with the electron beam, and a continuous movement of the stage, or each image in sheet form, acquired by two-dimensional scanning with the electron beam, and a movement of the stage, will be an image as an inspection target, namely, an inspection image. The inspection images accumulated in the image memory 213 are sent out to the comparative inspection unit 217 via the bus 216, whereupon a comparative inspection is conducted. Prior to the inspection, design data corresponding to the wafer 206 as the subject under inspection, and the templates for use in registration are kept stored in the memory (DB) 218. Herein, the design data is data expressing a contour of an interconnection as the set of segments while the template represents information on an optional partial region (the same as a template for template-matching in an image processing field) including an interconnection pattern of the design data, and other supplementary information in the region, the design data being further described in detail under (1-2). Further, the partial region is described herein; however, mention may be made of the whole region as well.

The template extraction processor 224 of the template 227 reads the design data from the memory 218, thereby extracting a template for use in registration. At this point in time, parameter information for use in extracting the template is determined by either reading characteristics data 226 of the defect inspection apparatus to thereby execute calculation, or by receiving an input from a user in the GUI 225. By "parameter information" is meant information on the characteristic of each template to be extracted, and so forth, including, for example, the size of a template, the number of templates, complexity of interconnections, thickness of each interconnection, and so forth. The templates as extracted are saved in the DB 218 to be used at the time of an inspection. This step for a template-extraction process may be taken either at time of an inspection, or before the inspection.

The design-data processing sub-unit 219 of the comparative inspection unit 217 reads design data corresponding to the inspection image from the DB 218. Further, the design-data processing sub-unit 219 converts the design data fully fitted in the pattern-deformation processing sub-unit 221 into an image, thereby executing data-processing as well, to enable the image to be compared with the inspection image.

The matching-processing sub-unit 220 reads a template corresponding to the design data as read by the design-data processing sub-unit 219 from the template 227, executing registration between the design data and the inspection image using the template to thereby calculate a corresponding relationship of coordinates. The applicant's invention has one feature in that the registration using plural types of templates is executed plural times against a predetermined region of the inspection image.

The pattern-deformation processing sub-unit 221 makes use of the corresponding relationship of the coordinates, as calculated in the matching-processing sub-unit 220, thereby causing the position of a whole pattern obtained by deforming the design data to be fully fitted to the inspection image.

The defect-determination processing sub-unit 222 corrects misregistration through full fitting in the pattern-deformation processing sub-unit 221, comparing the design data to which deformation processing is applied with the inspection image, thereby making a defect-determination.

The inspection-image processing sub-unit 223 applies noise removal and removal of luminance nonuniformity, by Gaussian convolution, to the inspection image as a pretreatment for the comparative inspection.

The inspection image resulting from the defect-determination, and an image based on the design data after correction of the position are displayed on the Graphic•User•Interface (GUI) 215 to be checked by the user.

Figure 1:
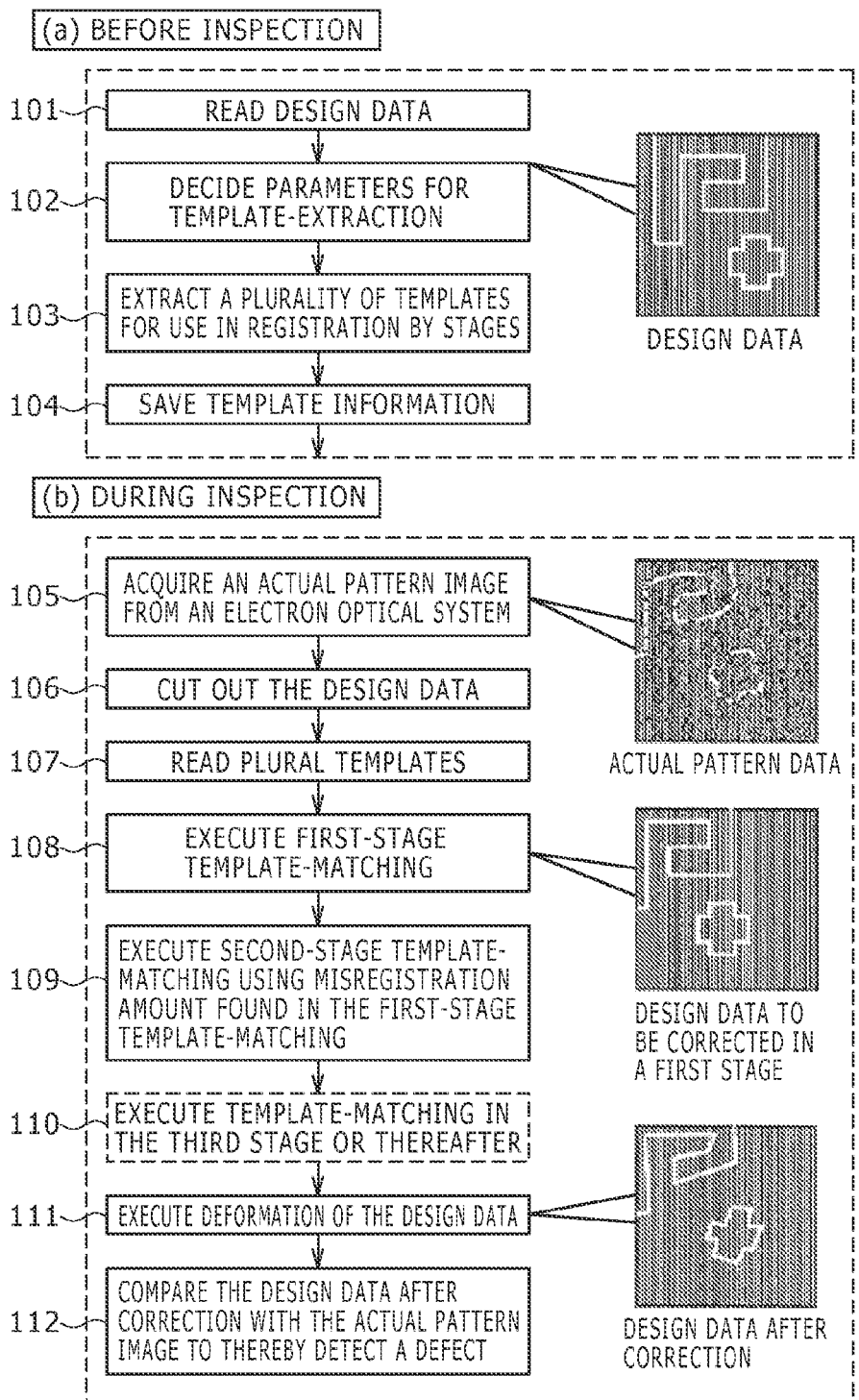
FIG. 1 is a flow chart showing a defect inspection method according to first embodiment of the invention.

Next, there is described hereinafter a flow of a defect inspection method according to the first embodiment of the invention with reference to FIG. 1. (a) in FIG. 1 shows a flow of template-extraction executed before inspection, and (b) in FIG. 1 shows a flow of defect-detection executed during the inspection.

As described in the foregoing, the cause of the misregistration between the design data and the inspection image includes a distortion due to scanning with an electron beam, a distortion due to electrostatic charging of a wafer, a distortion accompanying rocking occurring at the time of scanning the stage, and so forth, besides an error of the system, attributable to an error in a travelling amount at the time of scanning the stage with the wafer placed thereon. The maximum value of a misregistration amount, frequency characteristics, and so forth will vary depending on the cause of the misregistration.

Accordingly, one of the features of the present embodiment lies in that multiple parameters (for example, a template size, and so forth) coping with respective misregistration characteristics are prepared against different causes of the misregistration, templates are extracted one by one according to the respective parameters, and registration is executed in decreasing order of template capability of coping with the misregistration characteristic, that is, from a template adaptable to the characteristic having a large registration amount to a template adaptable to the characteristic having a small registration amount, thereby correcting the misregistration of a pattern in whole.

The flow of the defect inspection method is hereinafter described.

In a flow (a) before inspection, the template extraction processor 224 reads design data corresponding to a subject under inspection from the memory 218 (step 101).

The template extraction processor 224 calculates the parameter information for use in extraction of a template from a specification value (the characteristics data 226) of the apparatus, or set the parameter information from the GUI 225, and so forth (step 102).

The template extraction processor 224 finds an evaluation value dependent on a segment amount of interconnections, an interconnection line width, pattern uniqueness, and so forth on the basis of the design data as read in the step 101, and the parameter information as set in the step 102, thereby extracting multiple templates for use in registration by stages on the basis of the evaluation value (step 103).

The plural templates extracted in the step 103 are saved in the memory 218 (step 104).

During the inspection, a pattern image (an inspection image) on the wafer is acquired by the electron optical system 201 in an inspection flow (b) (step 105).

The design-data processing sub-unit 219 reads a region corresponding to the inspection image, acquired in the step 105 by cutting out the region from the design data accumulated in the DB 218 (step 106).

Further, the design-data processing sub-unit 219 reads the plural templates that are present on the design data, cut out in the step 6 (step 107). These templates are the ones that are extracted in the step 103, and saved in the memory 218 in the step 104.

The matching processing sub-unit 220 executes first-time template matching using the design data, and any one template selected from among the plural templates that are read in the step 107 against the inspection image (step 108). By so doing, there is found a first misregistration amount between the inspection image and the design data. As described above, the template represents a partial region of the design data, and this partial region is converted into an image to thereby form a design image (a design data image), whereupon template-matching is executed between the design image and the inspection image to find a corresponding relationship between coordinates of the design data and coordinates of the inspection image, thereby working out a misregistration amount.

The matching processing sub-unit 220 executes a second-time template matching with the use of the misregistration amount found from the result of the matching in the step 108, serving as a starting point (step 109). In this case, use is made of a template other than the one used in the step 108, as selected among the plural templates that are read in the step 107. Further, if there exists a template for use in a third time template-matching or thereafter, template-matching in the third time or thereafter is executed with the use of a misregistration amount found from the result of matching in a preceding stage, serving as a starting point (step 110).

The pattern-deformation processing sub-unit 221 executes deformation of the design data using the results of all the template-matching, thereby correcting the position of a pattern as a whole (step 111).

The design-data processing sub-unit 219 converts the design data after correction into an image, and the defect-determination processing sub-unit 222 compares the design image with an actual pattern image (an inspection image) to thereby detect a defect (step 112). Further, before comparison of the design image with the inspection image, the noise removal, and the removal of luminance non-uniformity by Gaussian convolution may be made to the inspection image as the pretreatment for the comparative inspection by the inspection image processing sub-unit 223.

(1-2) Overview of a Template.

Figure 3:
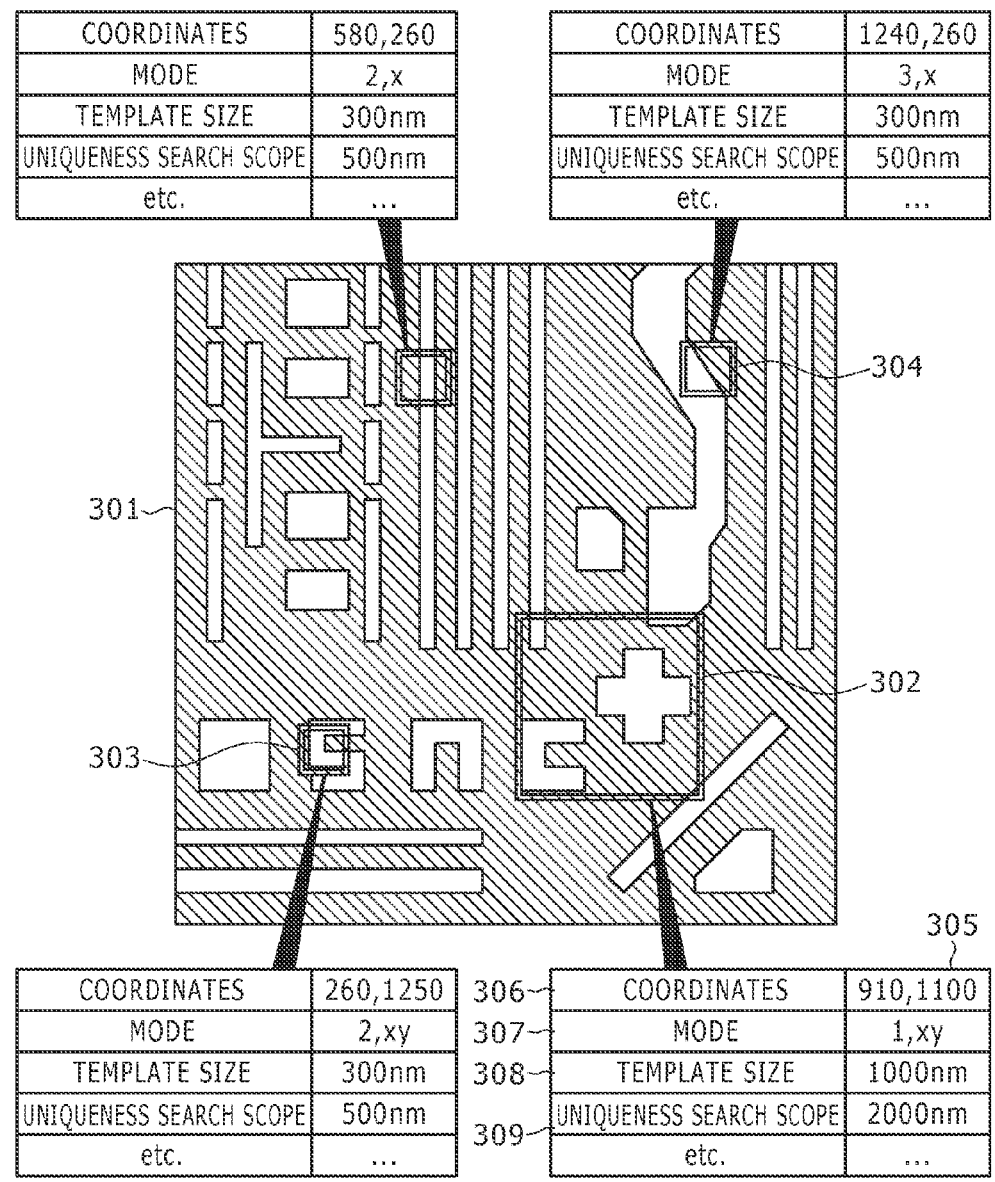
FIG. 3 is a view showing the overview of a template according to the first embodiment of the invention.

FIG. 3 is a view showing the overview of a template for use in registration according to the first embodiment of the invention.

Reference numeral 301 denotes design data, reference numerals 302, 303, and 304 each denote a template region, and reference numerals 306 to 309 each denote template information corresponding to the template region 302.

As an example of an output result of the template-extraction executed against the design data 301 in the step 103 of FIG. 1, the are shown the regions 302, 303, 304 each being selected as the template. The individual templates 302, 303, 304 have template information. For example, template information 305 corresponding to the template 302 includes information 306 on coordinates of a template position, mode 307 for use in registration, template size 308, uniqueness search scope 309, and so forth.

Coordinates 306 indicate the coordinates of the center of the template region 302, on the design data. Mode 307 represents information on for which stage (first, second, and so on) matching the relevant template can be used, in which direction (both XY directions, an X-direction only, a Y-direction only, and so forth) of an image registration can be uniquely executed, and so forth. Mode information of, for example, the template 302 being (1, xy), the template 302 can be used for the first-stage matching, and is available for use in registration in both the XY-directions.

Template size 308 is information indicating the size of a template region. In the case of this example, only one numerical value is available, and therefore, the information indicates that the template region is a square having common sides. However, template size 308 may have information indicating that the template region has a longitudinal size differing from a transverse size, in which case, the information has two different numerical values.

Uniqueness search scope 309 indicates information on an area of a region where the uniqueness of this template pattern is ensured. If a misregistration amount between the actual image and the design data at the time of matching is equal to this search scope, or less, matching can be uniquely carried out.

The template 303 differs from the template 302 in respect of mode, template size, and uniqueness search scope as compared with latter. As the template 303 has mode (2, xy), the template 303 can be used for the second-stage matching in the step 109 of FIG. 1.

The first matching has an object of correcting the misregistration of the wafer in whole, attributable to an error in the travelling amount of the stage, and the second matching has an object of correcting the misregistration within a localized region, caused by a distortion. Because the maximum amount of the misregistration attributable to rocking caused by a distortion is small as compared with the misregistration attributable to the error in the travelling amount of the stage, it becomes necessary to set parameters for extraction of templates coping with each misregistration.

Accordingly, with the applicant's invention, a template smaller in template size, and uniqueness search scope than a template for use in the first template-matching is used for the second template-matching, and the second matching is executed with the use of a first misregistration amount calculated on the basis of the result of the first matching, as a starting point, thereby enabling misregistration that cannot be fully corrected by the first matching to be corrected. Further, in order to calculate localized misregistration amount in the second matching, a larger number of the templates than the number of the templates used in the first matching are preferably used, which will described in detail with reference to FIGS. 4A, 4B, and 5.

The template 304 differs in mode information from the template 303 in that the template 304 has mode (3, x). Accordingly, the template 304 can be used for matching in the third staged and thereafter in the step 110 of FIG. 1, being available for use in correction of misregistration only in the X-direction. In the case of a pattern where a line and space are alternately repeated, there exists no pattern other than one where registration can be made only in either the X-direction or the Y-direction, and therefore, misregistration in whichever pattern can be comprehensively corrected.

Figure 4A:
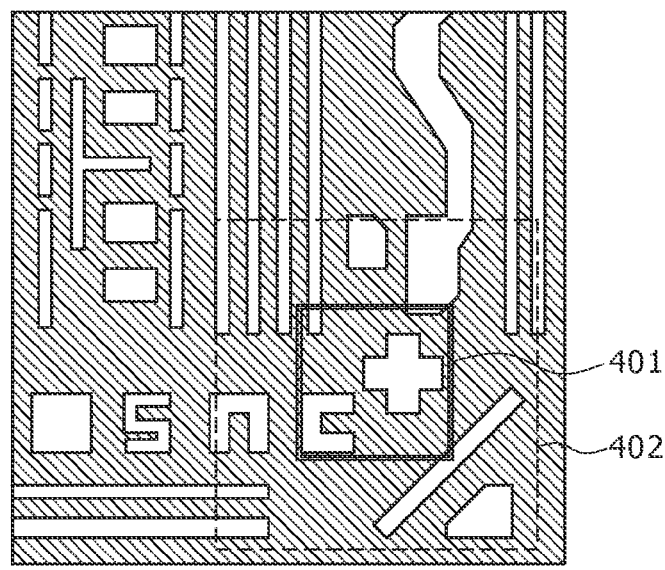
FIGS. 4A and 4B are views for describing a uniqueness search scope according to the first embodiment of the invention.
Figure 4B:
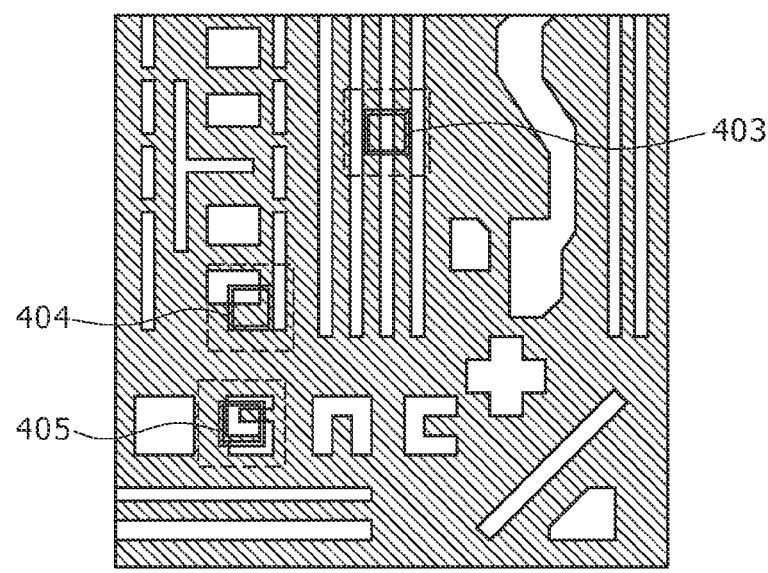

FIGS. 4A and 4B are views for describing a uniqueness evaluation scope according to the first embodiment of the invention.

FIG. 4A shows a template 401 for use in the first-stage matching. The uniqueness search scope of the template 401 is a region 402 indicated by a rectangle delineated by a dotted line.

The design data in whole, and the template region 401 are each converted into an image to thereby form a design image, and a template image, respectively. Subsequently, the template image is superimposed on the design image at an optional position except for the position of the template 401, within the uniqueness search scope 402, to thereby find correlation between the respective images. If correlation of the images at respective pixel positions is lower than a predetermined threshold value, it is determined that the template region 401 is a unique pattern in the region of the uniqueness search scope 402. As for an evaluation value of correlation, it need only be sufficient to use the sum of squared difference of a luminance value, normalized cross-correlation, and so forth.

For example, in the case of correcting the misregistration attributable to the error in the travelling amount of the stage during the first-stage matching, it need only be sufficient to set a search scope region to a size on the basis of a misregistration amount attributable to the maximum error. However, if the worst happens in the first-stage matching, a misregistration amount will be the maximum amount of the misregistration attributable to the error in the travelling amount of the stage plus the maximum amount of misregistration attributable to other causes such as distortions, and so forth, so that one side of the search scope rectangular region need be set to have width 2*(the sum of the maximum value of the misregistration attributable to the error in the travelling amount of the stage plus the maximum value of a misregistration component as each correction target in the first stage or later stages). For this reason, the template for use in the first stage matching has a relatively large search scope region as compared with the template for use in the second stage matching or later stages.

The smaller a template size becomes, the less is the number of unique pattern candidates present in the relevant template region. Further, as the search scope region increase in size, so does a scope for evaluating correlation in size, so that the number of the unique pattern candidates decreases. Accordingly, it is necessary to set a template size proportional to the area of the search scope.

FIG. 4B shows a template for use in the matching in the second-stage, third stage, and thereafter, and the uniqueness search scope thereof. In the case of, for example, the matching in the second-stage and thereafter, it is supposed that misregistration amounts attributable to the distortion caused by the rocking due to stage scanning, and the distortion caused by electrostatic charging due to electron beam scanning, respectively, are calculated, in which case, it is assumed that the misregistration attributable to the stage error has already been corrected in the matching in the first-stage, so that the respective search scopes of templates 404, 405 need to accommodate only a width of the maximum amount of the misregistration attributable to the distortion in the second stage matching. Further, a template 403 is a pattern of longitudinal lines and space, and registration only in the x-direction can be executed, so that the template 403 can be put to use for matching in the third stage, and thereafter. In the case of matching by making use of this template, it need only be sufficient to execute matching with the use of a misregistration amount found from the matching result of the template 404 in the vicinity of the template 403 as a starting point.

(1-3) Effects of Matching in not Less than Two Stages

Figure 5A:
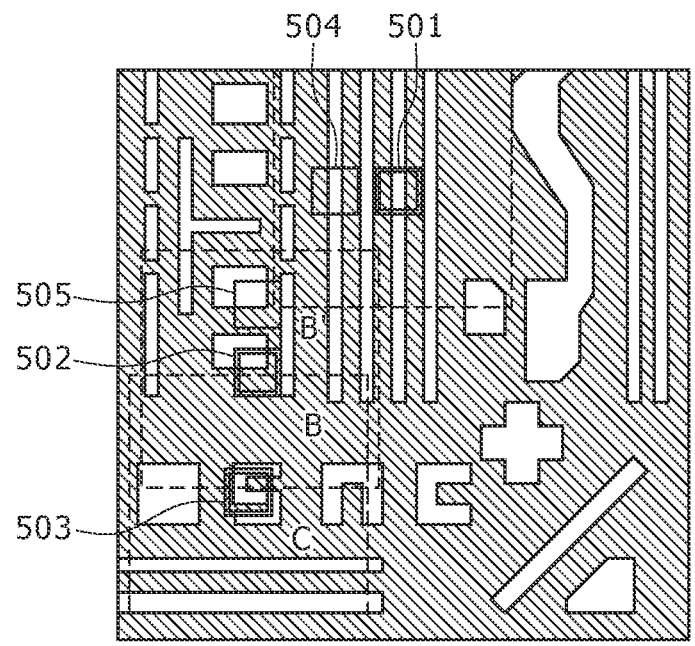
FIGS. 5A and 5B are views for describing effects of multistage matching according to the first embodiment of the invention.
Figure 5B:
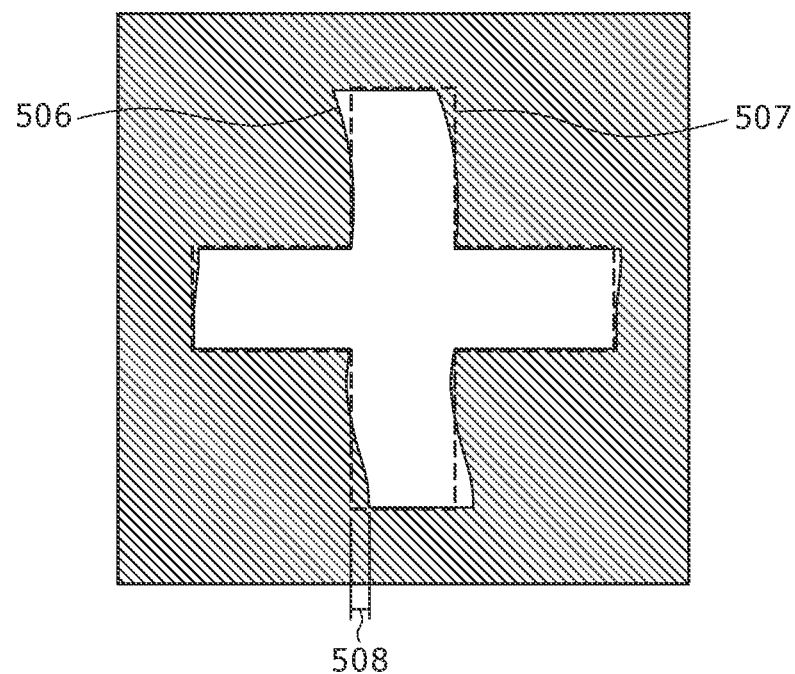

FIGS. 5A and 5B are views for describing effects of multistage matching according to the first embodiment of the invention.

The effects of matching in not less than two stages are described hereinafter in comparison with the case of the matching in one stage only. Herein, there is assumed the case where a template is extracted simply on the basis of a template size as a parameter at the time of extracting the template.

FIG. 5B shows a template image in the case where a template size is set to a value larger than a misregistration cycle due to a distortion.

FIG. 5B is a view of a template pattern image (delineated by a dotted line 507) superimposed on an inspection image (delineated by a solid line 506), showing that a misregistration attributable to a distortion has occurred to the top, and bottom parts of a cross-like pattern shape, respectively, in a template region. The view represents an example where the template size is set to a value larger than the misregistration cycle due to the distortion.

In the case of matching in this template, the template size is larger than the misregistration cycle due to the distortion, so that the contour of the pattern of the inspection image 506 is distorted, and the template does not fully coincide with the contour of the pattern, rendering it impossible to detect a localized misregistration 508.

FIG. 5A is a view of a template image in the case where a template size is set to a value sufficiently smaller than the misregistration cycle due to the distortion. The view shows examples of templates 501, 502, 503 each having a template size sufficiently smaller than the misregistration cycle due to the distortion. If the template size is sufficiently smaller than the misregistration cycle due to the distortion, the number of the unique pattern candidates will decrease as described under (1-2). For example, the template 501 matches up in shape with a pattern region 504 within a search scope, so that the template 501 is low in uniqueness, and therefore, is not available for registration. Similarly, the template 502 matches up in shape with a pattern region 505, and therefore, is not available for registration either. In short, in the case of setting a template size sufficiently smaller than the misregistration cycle due to the distortion, the number of unique patterns will decrease, and it becomes difficult to comprehensively extract a template from among the patterns in whole. Thus, unless a template can be selected, a misregistration amount cannot be found, resulting in failure in processing for correction of misregistration.

It is evident from the two examples described as above that it is difficult to correct both the misregistration attributable to the error in the stage scanning, and the misregistration attributable to the distortion with high accuracy using a template with a single parameter. In contrast, with the applicant's invention, templates having various parameters differing from each other are extracted on the precondition that the matching is executed in the two stages as described under (1-2), to thereby limit the search scope of each of the various templates to only requisite minimum regions, whereupon correction of misregistration of the patterns in whole can be executed with high accuracy.

(1-4) Template Extraction Method

A template extraction method (the step 103 of FIG. 1) is described hereinafter.

First, imaging of design data corresponding to a subject under inspection is executed to thereby create a design image, and respective pixels of the design image are adopted as template candidates. Multiple evaluation values fi as described under (1) to (4) given below are calculated against the respective template candidates, and the candidate having a high evaluation value is selected as a template. With the present embodiment, a weighted addition as expressed by formula (1.1) is applied to an evaluation value fi to thereby finally fined one evaluation value F, and a template candidate having the highest overall evaluation value F is selected as a template for use in registration:

$$F = \sum_i \alpha_i \cdot f_i \qquad (1.1)$$

provided that for weight $\alpha_i$, use is made of a value inputted as a parameter in the step 102.

(1) An x-edge evaluation value and a y-edge evaluation value are described hereinafter.

Figure 6A:
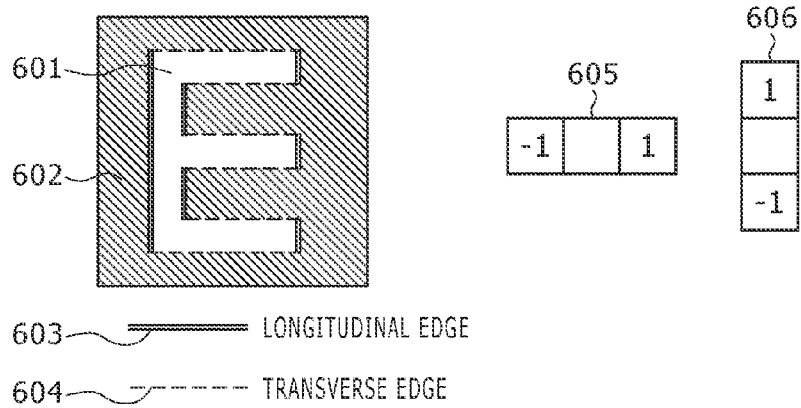
FIGS. 6A to 6E are views for describing a template evaluation value according to the first embodiment of the invention.

FIG. 6A is a view for describing a template evaluation value (an edge evaluation value) according to the first embodiment of the invention.

In a design data image (the design image), a region 601 is an interconnection part and a region 602 is a background part. As the number of edge parts of an interconnection increases within a template, so does the number of parts of the interconnection, available for fitting at the time of matching, so that higher accuracy in a matching result can be expected. Accordingly, a longitudinal edge 603 of the design data image, and a transverse edge 604 thereof are each defined as an evaluation value. In a method for working out this evaluation value, the sum f1 of luminance intensity outputted by applying a differential filter 605 to the design data image, and the sum f2 of luminance intensity outputted by applying a differential filter 606 to the design data image are each defined as the evaluation value.

(2) An evaluation value of a ratio of the interconnection part to the background part is described hereinafter.

Figure 6B:
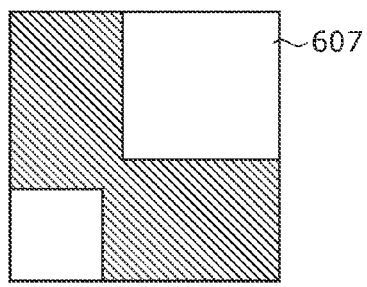
Figure 6C:
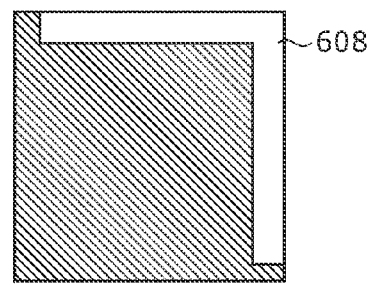
Figure 6D:
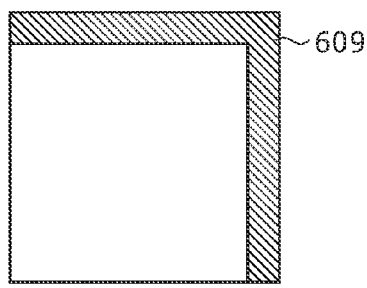

FIGS. 6B, 6C, and 6D each are a view for describing an evaluation value (the evaluation value of the ratio of the interconnection part to the background part) of the template according to the first embodiment of the invention.

Although a design data image 607 in FIG. 6B, a design data image 608 in FIG. 6C, and a design data image 609 in FIG. 6D each have the same edge evaluation value as described under (1) as above, respective proportions of the interconnection part, and the background part to the image in whole, in the design data image 608, and the design data image 609, respectively, are smaller as compared with the case of the design data image 607. In the case where expansion, degeneracy, or a distortion occurs to an interconnection in the inspection images corresponding to the design data images 608, 609, respectively, there is a possibility that the interconnection region, and the background region will no longer exist in the inspection images corresponding to the design data images 608, 609, respectively. With the design data image 607 where the interconnection region and the background region evenly exist, higher matching accuracy is expected, and therefore, a ratio of the interconnection region to the background region is adopted as the evaluation value. In a method for working out the evaluation value, an area of the background part of a template is defined S1 while an area of the interconnection part is defined S2, and an evaluation value f3 is calculated by the following formula (1.2):

$$f_3 = 0.5 - \frac{\text{MIN}(S_1, S_2)}{S_1 + S_2} \quad (1.2)$$

provided that MIN ($S_1$, $S_2$) returns a smaller value of $S_1$ and $S_2$.

(3) An evaluation value of an interconnection width is described hereinafter.

Figure 6E:
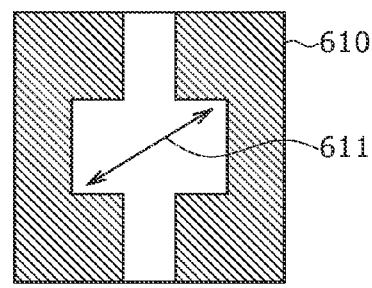

FIG. 6E is a view for describing an evaluation value (the evaluation value of the interconnection width) of the template according to the first embodiment of the invention.

A thin interconnection region is susceptible to pattern deformation due to an optical proximity effect as compared with a thick interconnection region. The pattern deformation causes deterioration in matching accuracy, and in case the interconnection region disappears due to degeneracy, matching itself will fail. Accordingly, a maximum width 611 of an interconnection region in a template image 610 is evaluated, and selection is made of a template candidate containing a pattern where the maximum width 611 is as large as possible. As for a method for working out an evaluation value, a distance image is calculated from a design data image, and a maximum luminance value is adopted as the evaluation value.

(4) An evaluation value of uniqueness is described hereinafter.

Figure 7A:
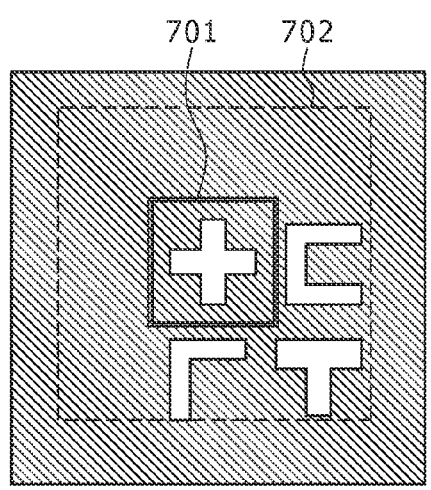
FIGS. 7A to 7C are views for describing an evaluation value according to the first embodiment of the invention.
Figure 7B:
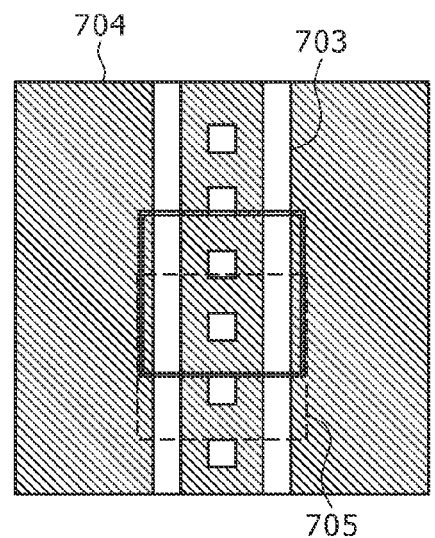
Figure 7C:
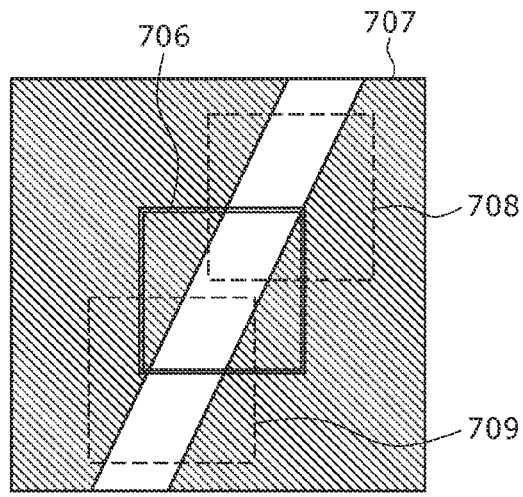

FIGS. 7A to 7C are views for describing an evaluation value of a template (the evaluation value of uniqueness) according to the first embodiment of the invention.

A double line region 701 of FIG. 7A is a template candidate, and a dotted line region 702 is the uniqueness search scope of the template candidate. A correlation value between a design data image and a template image is found in the uniqueness search scope 702, excluding the region 701, and the evaluation value is calculated from the maximum value of the correlation value. For the correlation value, it need only be sufficient to use, for example, normalized cross-correlation, and so forth. If a template image is T(x, y), an image overlapping a template, inside a search scope, is I(x, y), a longitudinal size of the template image is height, and a transverse size thereof is width, an evaluation value is expressed by the following formula (1.3) when normalized cross-correlation $R_{NCC}$ is used:

$$R_{NCC} = \frac{\sum_{y=0}^{height-1} \sum_{x=0}^{width-1} I(x, y) T(x, y)}{\sqrt{\sum_{y=0}^{height-1} \sum_{x=0}^{width-1} I(x, y)^2 \times \sum_{y=0}^{height-1} \sum_{x=0}^{width-1} T(x, y)^2}} \quad (1.3)$$

$$f_5 = \frac{1}{2}(1 - R_{NCC})$$

The normalized cross-correlation $R_{NCC}$ has a value in a range of −1 to 1, expressing that the higher the value is, the stronger the correlation is, so that the higher the evaluation value according to the formula (1.3) is, the more the uniqueness of the template image in the search scope is ensured.

In a design data image of FIG. 7B, a double line region 703 is a template, and a search scope is an image 704 in its entirety. In this case, because the same patterns exist in a region 705, registration in the Y-direction is impossible. For this reason, the template 703 is saved to serve as a template for use in registration in the X-direction only during the second stage, and thereafter.

In a design data image of FIG. 7C, a double line region 706 is a template, and a search scope is an image 707 in its entirety. This template 706 has a pattern identical to respective patterns of regions 708, 709, so that registration with the use of the template cannot be uniquely made in either the X-direction or the y-direction. However, in a situation where a position in either the X-direction or the y-direction is decided as a result of matching of a nearby template, the template can be used for registration. Accordingly, at the time of saving this template, the template is saved under mode information stating that registration is enabled provided that the registration be executed in the second stage, and thereafter. A precondition in this case is the condition under which registration in at least either the X-direction or the y-direction is decided by virtue of a nearby template.

Next, there is described a method for adjusting the number of templates to be extracted.

Figure 8A:
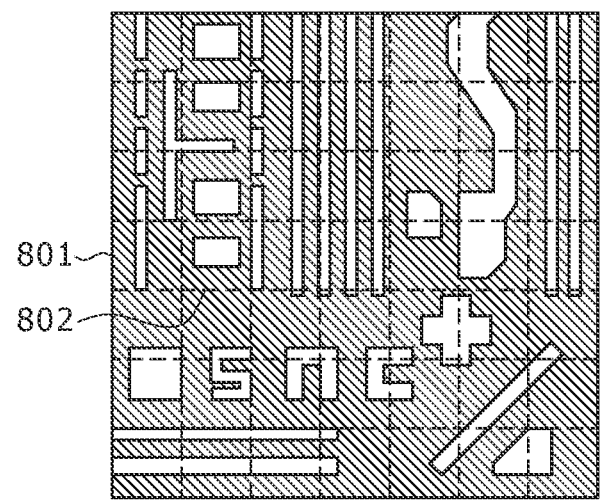
FIGS. 8A and 8B are views for describing an array region for extracting the templates, according to the first embodiment of the invention.
Figure 8B:
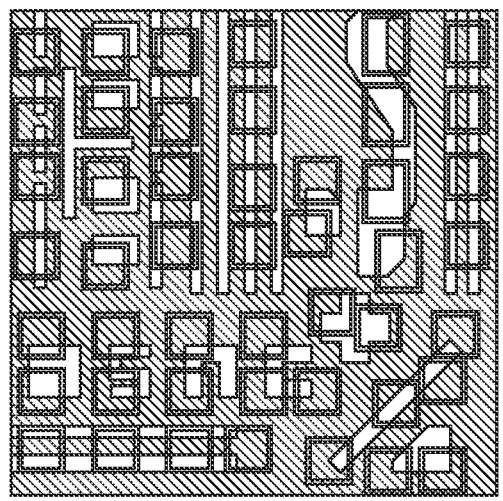

FIGS. 8A and 8B are views for describing an array region for use in extracting templates, according to the first embodiment of the invention.

If templates can be extracted at an extraction interval not more than half a wavelength of a distortion frequency characteristic, distortion correction will be enabled. Accordingly, design data 801 shown in FIG. 8A is partitioned into arrays 802, and templates having the highest evaluation value in respective rectangles of the arrays 802 are extracted one by one. In a design image of FIG. 8B, a double-line region is a design template that is extracted. If an interval between the arrays 802 is set as shown in the figure, this will render it possible to comprehensively extract the templates at a frequency sufficient to correct localized misregistration attributable to a distortion. Thus, in order to detect a defect with high accuracy, a frequency at which the templates are extracted need be adequately set according to a frequency at which a distortion occurs, and a design rule for a design pattern.

(1-5) Template-Extraction Parameter

A method (the step 102 in FIG. 1) for setting a parameter for use in template-extraction is described hereinafter.

FIG. 9 shows an example of a GUI for setting a parameter for use in template—extraction according to the first embodiment of the invention. With the present embodiment, a user can set a desired parameter through the GUI shown in FIG. 9.

In item 901 of the GUI, a parameter of a template for use in the first-stage matching is set. A template size (transverse width, longitudinal width) can be put into an input box 902 on nm unit basis, a uniqueness search scope width can be put into an input box 903, and an array size can be put into an input box 904, respectively. In item 905, a template for use in the second-stage matching, and in item 906, a template for use in the third-stage matching can be set, respectively. By switching ON or OFF of a check box in each item, selection can be made on whether or not a template in the relevant item is extracted.

Further, in case that the setting of a parameter has not been made, a parameter is set at a default value, however, by administering specification data of the electron optical system, such as an error in stage registration, rocking frequency, and so forth on the DB, it is also possible to calculate a template size, and a uniqueness search scope from the specification data. Further, data of these defaults can be read on the GUI by pressing a load button 908, and a part of the parameters can be altered by the user. Once a parameter is set, a save button 907 is pressed, whereupon a setting file for extraction-parameter is internally saved to be used at the time of template—extraction.

Figure 10:
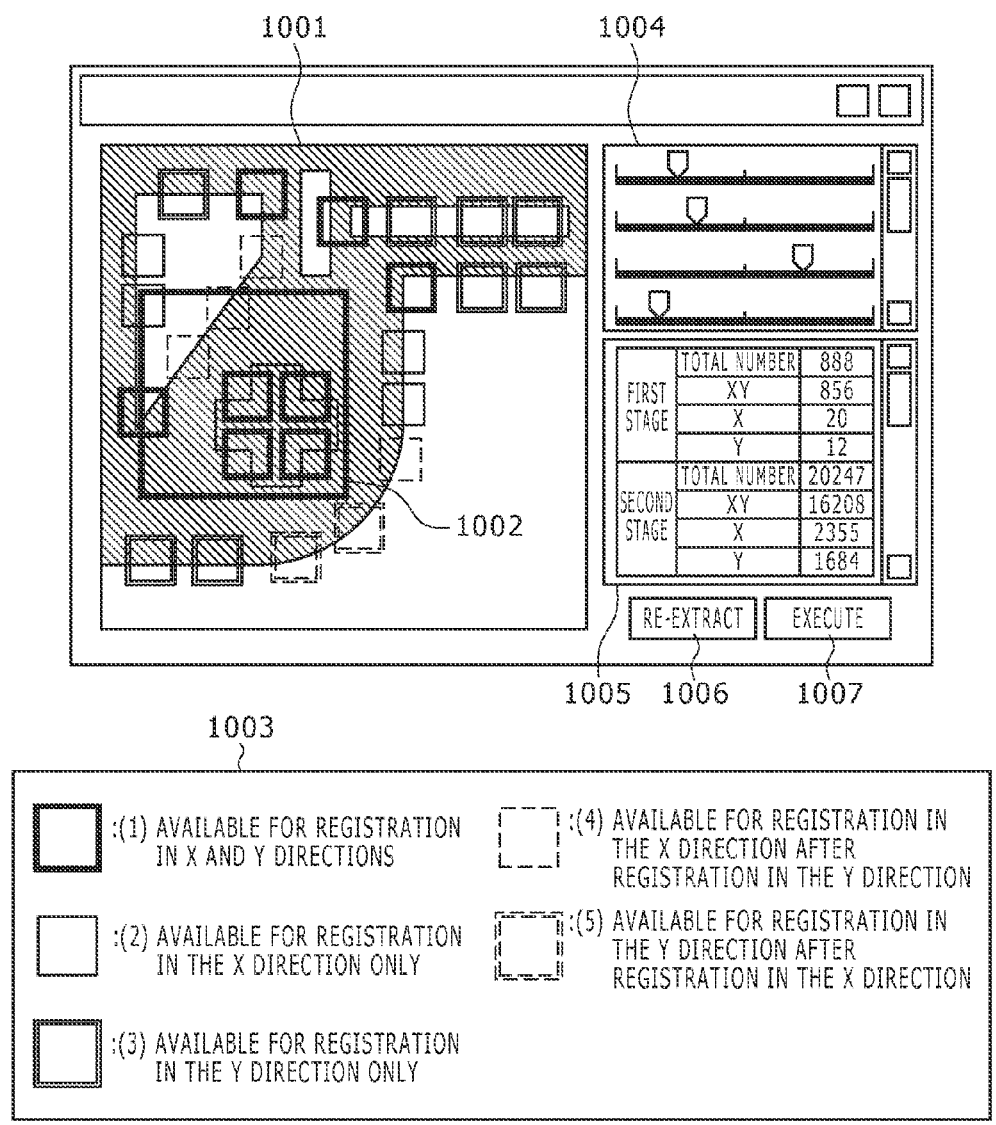
FIG. 10 is a view for describing a GUI for checking an extracted template, according to the first embodiment of the invention.

FIG. 10 is a view for describing a GUI for checking an extracted template according to the first embodiment of the invention. Operations and extracted templates, in a setting file, can be checked. Prior to execution of template-extraction in the design data in whole, the setting file of the extraction-parameter, as saved, is read to thereby execute template-extraction against design data in a partial region. In a window 1001 for checking the position of each extracted template, and the number of the extracted templates, the templates extracted on the design data are displayed as shown in a rectangle 1002. Mode information on the template-registration method can be checked by the type of a line of the rectangle, as depicted in Table 1003. A window 1004 is a slider for use in setting a weight of an evaluation value for template-extraction. If the slider is reset, and a re-extraction button 1006 is pressed, this will enable a template to be re-extracted at an evaluation value calculated by a new weight. In a window 1005, the number of templates can be displayed on the basis of the total number of the templates, on a stage-by-stage basis, and by the mode information. The template-extraction is executed on a trial basis against the design data in the partial region while varying a parameter for weight, and if an excellent parameter can be set, an execution button 1007 is pressed to thereby execute the template-extraction against the design data in whole.

Figure 18:
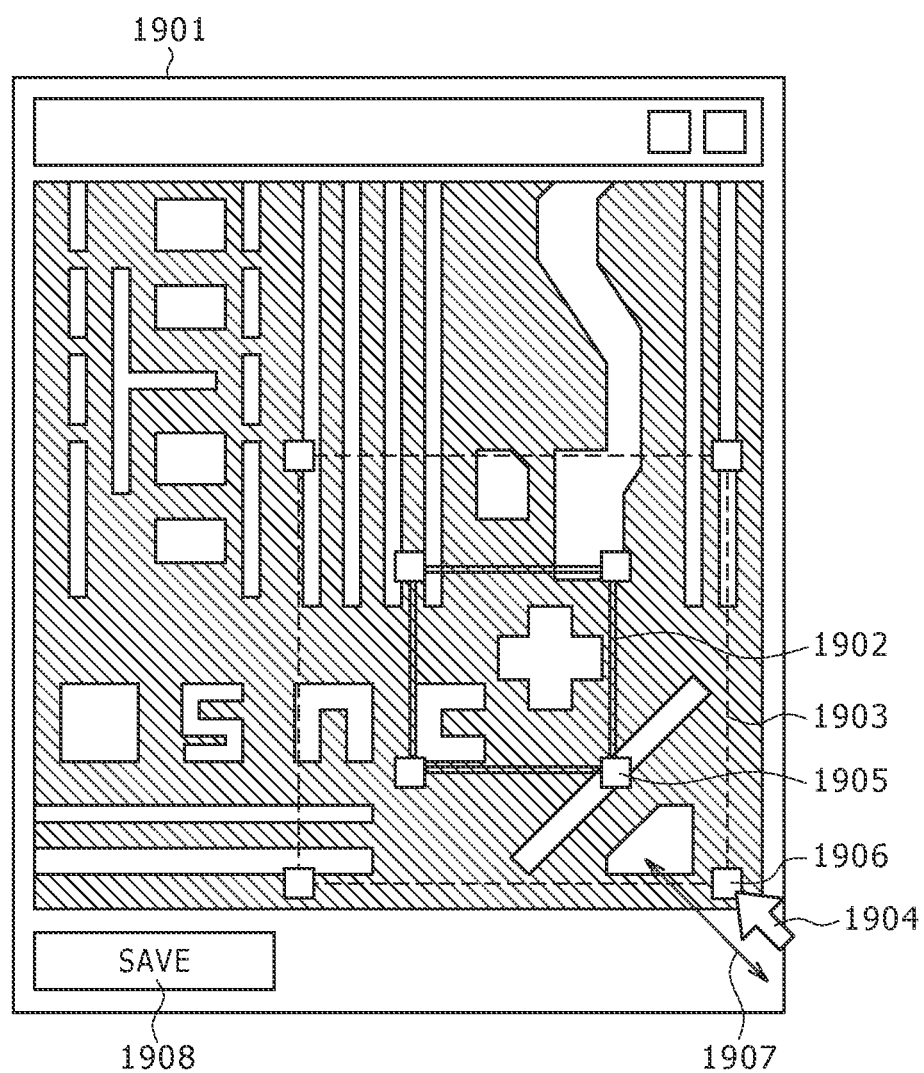
FIG. 18 is a view showing an example of a GUI for setting a parameter for a uniqueness evaluation value, according to the first embodiment of the invention.

FIG. 18 is a view showing an example of a GUI for setting a parameter for a uniqueness evaluation value, according to the first embodiment of the invention. This is one example of a GUI for use when a user sets, and amends respective parameters for the template size, and the uniqueness search scope.

In a window 1901, there is displayed design data on which a double-line rectangular region 1902 indicating a template size cut out from the design data, and a dotted-line rectangular region 1903 indicating the uniqueness search scope thereof are displayed. A user can manipulate a mouse cursor 1904 to move the rectangular region, and check the same against the design data, thereby determining whether or not the template size as cut out, and the uniqueness search scope thereof are appropriate. Further, respective magnitude of the template size and the uniqueness search scope can be altered by dragging anchor points 1905 and 1906, respectively in the direction of an arrow 1907 using a mouse cursor 1904. Upon the template size, and the uniqueness search scope being set to appropriate magnitude, the user can save those in the form of numeric values in a parameter file by pressing a button 1908.

(1-6) Matching Processing

A method for template-matching against an image acquired from the electron optical system 201 (from the step 105 to the step 110 in FIG. 1) is described hereinafter.

Figure 11A:
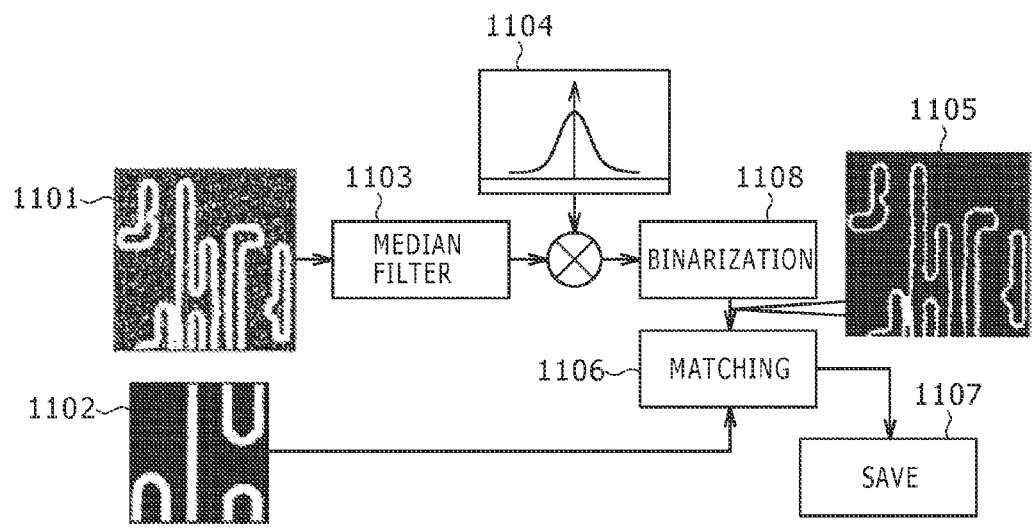
FIGS. 11A and 11B are views for describing a template-matching process according to the first embodiment of the invention.
Figure 11B:
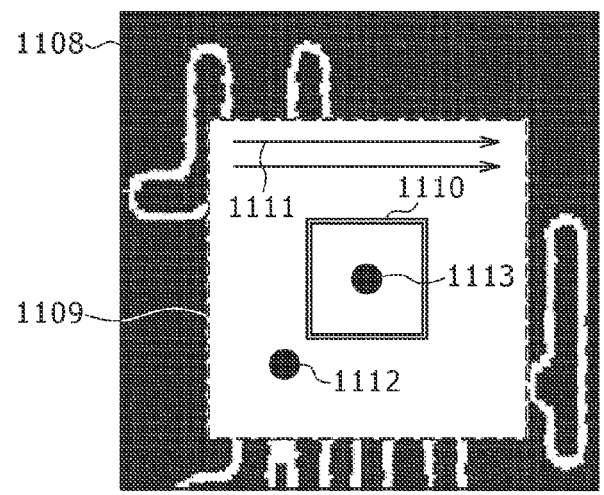

FIGS. 11A and 11B are views for describing a template-matching process according to the first embodiment of the invention.

FIG. 11A shows the overview of a matching flow. With the present embodiment, noise removal by a median filter 1103 and convolution of Gaussian 1104 is executed against an inspection image 1101 as acquired. A binarization process 1108 is applied to this output image to thereby create a pattern-edge image 1105 inside the inspection image 1101. Further, a template image (a design data image) 1102 depicting a contour borderline is created in a template region in the design data. A matching process 1106 between the template image 1102 and the pattern-edge image 1105 is executed.

FIG. 11B shows how to carry out the matching between the template image 1102 and the pattern-edge image 1105. The matching process 1106 calculates an evaluation value while scanning the position of a template image 1110 in the direction of an arrow 1111 in a search scope region of a pattern-edge image 1108 of FIG. 11B to thereby find a position where the evaluation value becomes the highest. For the evaluation value, use is made of, for example, normalized cross-correlation. A misregistration amount is found from a matching position 1112 as found, and a starting point 1113 to be saved on a memory 1107 (FIG. 11A).

Further, although one-time template-matching is described in this case, the matching process described as above need be executed using templates differing from each other in each step as shown in the steps 108, 109, and 110 of FIG. 1.

(1-7) Deformation of design data

A method for executing a process for deformation of the design data (the step 111 in FIG. 1) on the basis of misregistration information found by the matching is described hereinafter.

Figure 27A:
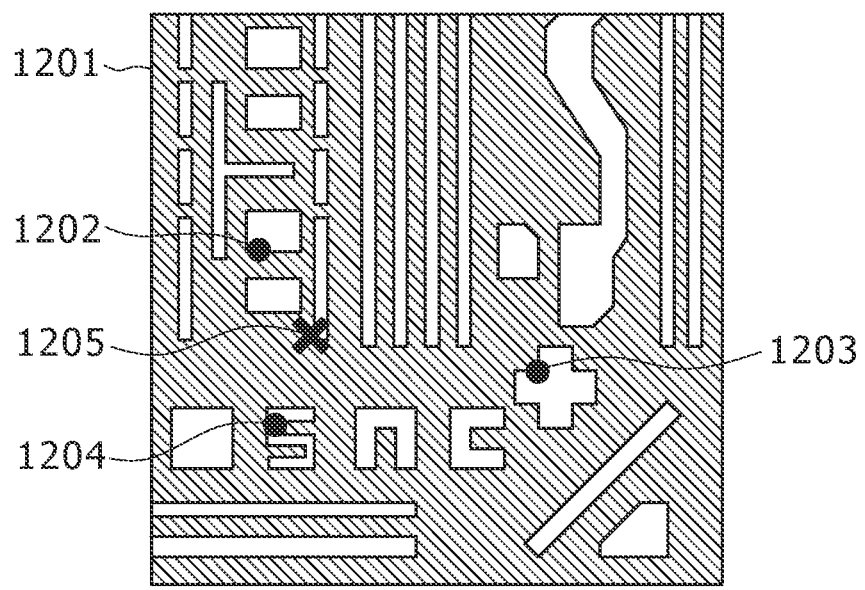
FIGS. 27A and 27B are views for describing a process for interpolating a misregistration amount at optional coordinates, according to the first embodiment of the invention.
Figure 27B:
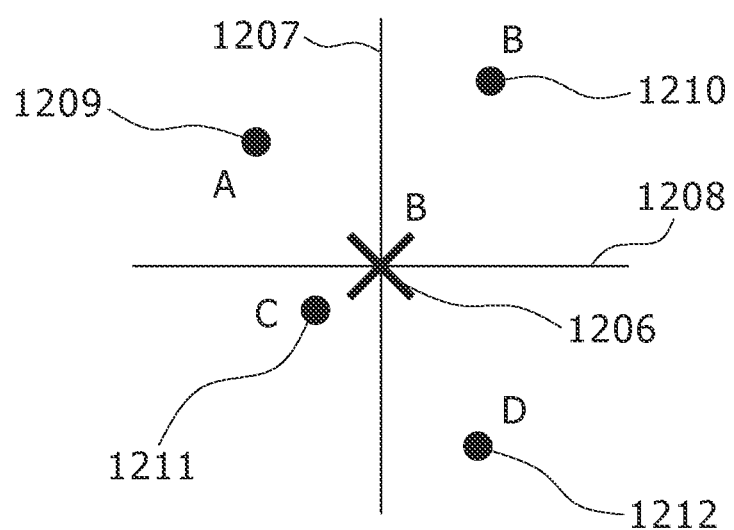

FIGS. 27A and 27B are views for describing a process for interpolating a misregistration amount at optional coordinates, according to the first embodiment of the invention.

Misregistration of a pattern in whole can be corrected by execution of a process for deforming design data from misregistration information found by matching. In order to execute continuous pattern-deformation, it is necessary to calculate a misregistration amount at an optional point using discrete misregistration information found by template-matching.

In design data 1201 in FIG. 27A, a misregistration amount has been calculated at points 1202, 1203, and 1204, over the data, from the result of a preceding matching. In this case, a misregistration amount at a point 1205 is found from the respective misregistration amounts of the points 1202, 1203, 1204, using, for example, Shepard interpolation method.

The Shepard-interpolation method is described with reference to FIG. 27B. In each of four regions centering around a point O (1206) for interpolation, partitioned by a vertical line, and a horizontal line, respectively, a sampling point closest to the point O is found from among sampling points A (1209), B (1210), C (1211), and D (1212). If these sampling points have values dA, dB, dC, and dD, respectively and are at distances 1A, 1B, 1C, and 1D, respectively from the point O, an interpolation value D is calculated by the following formula (1.4):

$$D = \frac{d_A \cdot l_A^{-2} + d_B \cdot l_B^{-2} + d_C \cdot l_C^{-2} + d_D \cdot l_D^{-2}}{l_A^{-2} + l_B^{-2} + l_C^{-2} + l_D^{-2}} \quad (1.4)$$

However, there can be the case where the four sampling points do not necessarily exist depending on the position of the point for interpolation, in which case, calculation is made on the assumption that a data value d, and length l are 0, respectively, in a region where the sampling point does not exist, thereby working out an interpolation value on the basis of the relevant values only in respective regions where the sampling point exists.

Next, the deformation of the design data is described hereinafter.

Figure 12A:
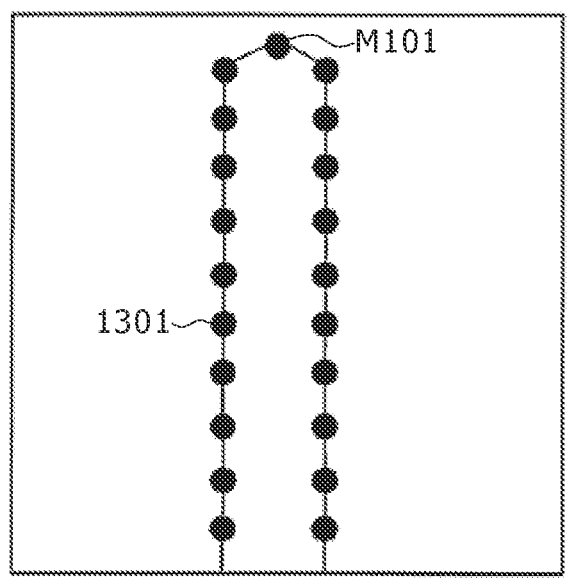
FIGS. 12A and 12B are views for describing a process for deforming the design data, according to the first embodiment of the invention.
Figure 12B:
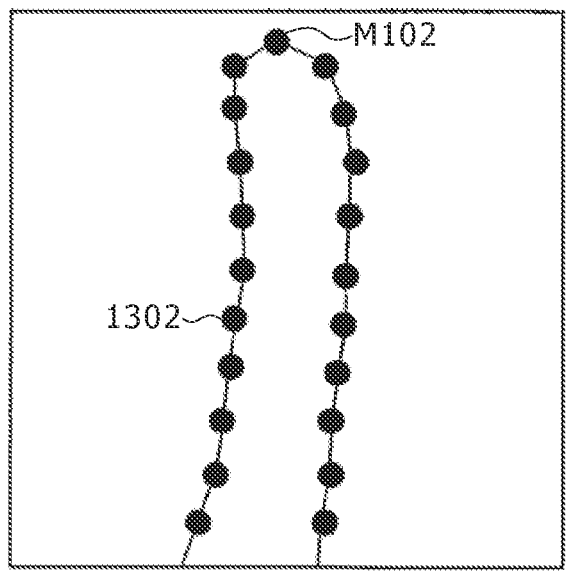

FIGS. 12A and 12B are views for describing a process for deforming the design data, according to the first embodiment. FIG. 12A is a view for expressing the design data prior to deformation, and FIG. 12B is a view for expressing the design data after the deformation. In the design data before converted into image data, the contour shape of an interconnection is represented by link information on multiple vertexes. Data correction is effected by offsetting a misregistration amount with respect to the coordinates of the vertex. More specifically, in the case of correcting a misregistration amount against a vertex M101, the misregistration amount is first found using the interpolation method described as above. It need be only sufficient to combine the coordinates of the vertex with the misregistration amount to update coordinates values, thereby finding a vertex M102 after correction.

(1-8) Defect detection processing

A method for executing defect-detection (the step 112 in FIG. 1) on the basis of the design data after correction and the inspection image is described hereinafter.

Figure 13:
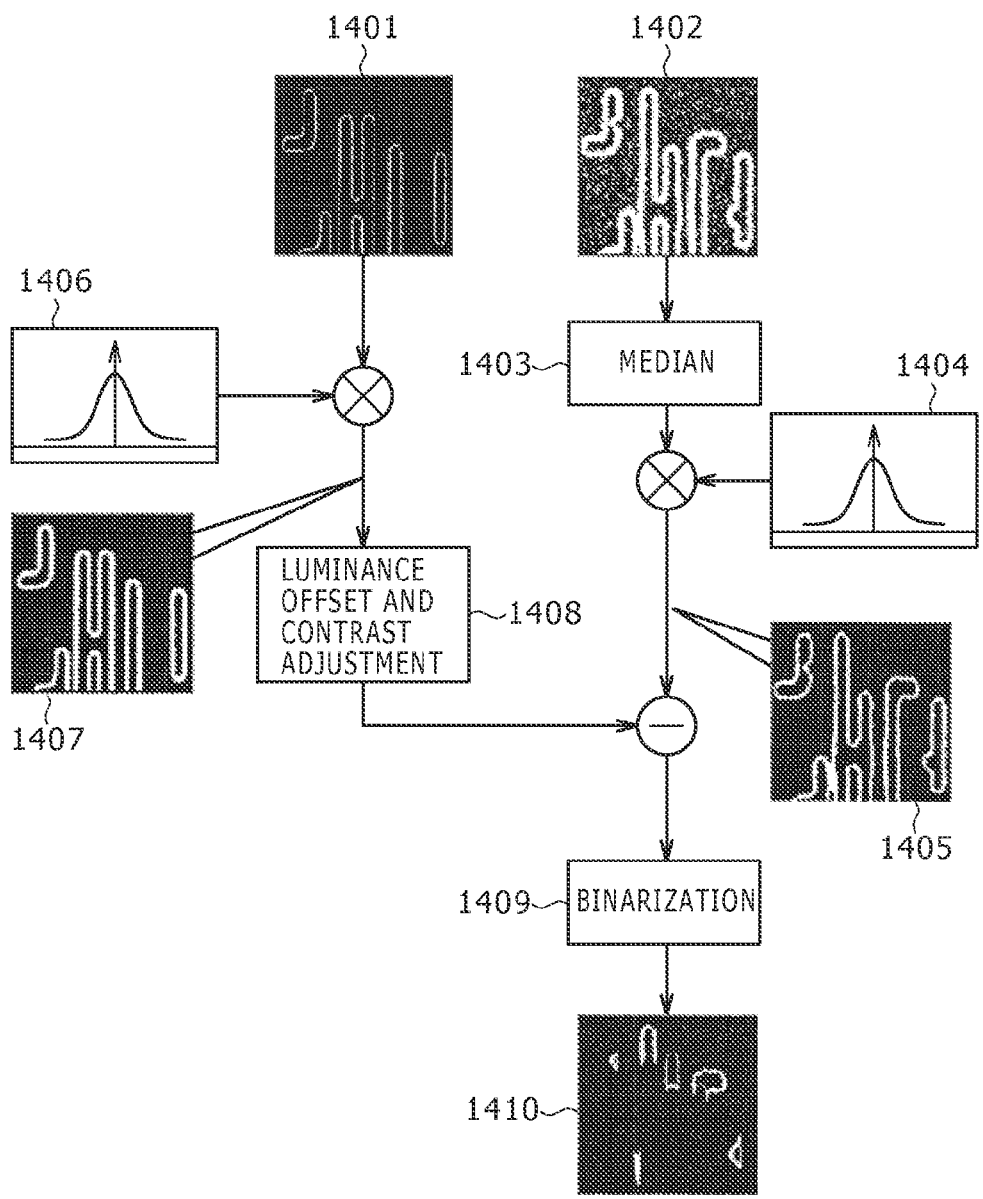
FIG. 13 is a view for describing a process for comparing the inspection image with the design data to thereby detect a defect, according to the first embodiment of the invention.

FIG. 13 is a view for describing a process for comparing the inspection image with the design data to thereby detect a defect, according to the first embodiment of the invention.

First, a pretreatment image 1405 is obtained by applying a median filter 1403, and convolution of a σ1 Gaussian 1404, as a nose-reduction process, to an inspection image 1402. Further, a pseudo SEM image 1407 convoluted with Gaussian 1406 having an electron beam spread σ2 is obtained against a design-data image after correction, in a region corresponding to the inspection image 140. In order that the pseudo SEM image 1407 coincides in gray value with the pretreatment image 1405, luminance offset and contrast adjustment 1408 is executed to thereby find a difference image from the pretreatment image 1405. By application of binarization 1409 to the difference image, there is acquired an image 1410 where a divergent part in shape, occurring between the design data and the inspection image, is detected as a defect.

Figure 14:
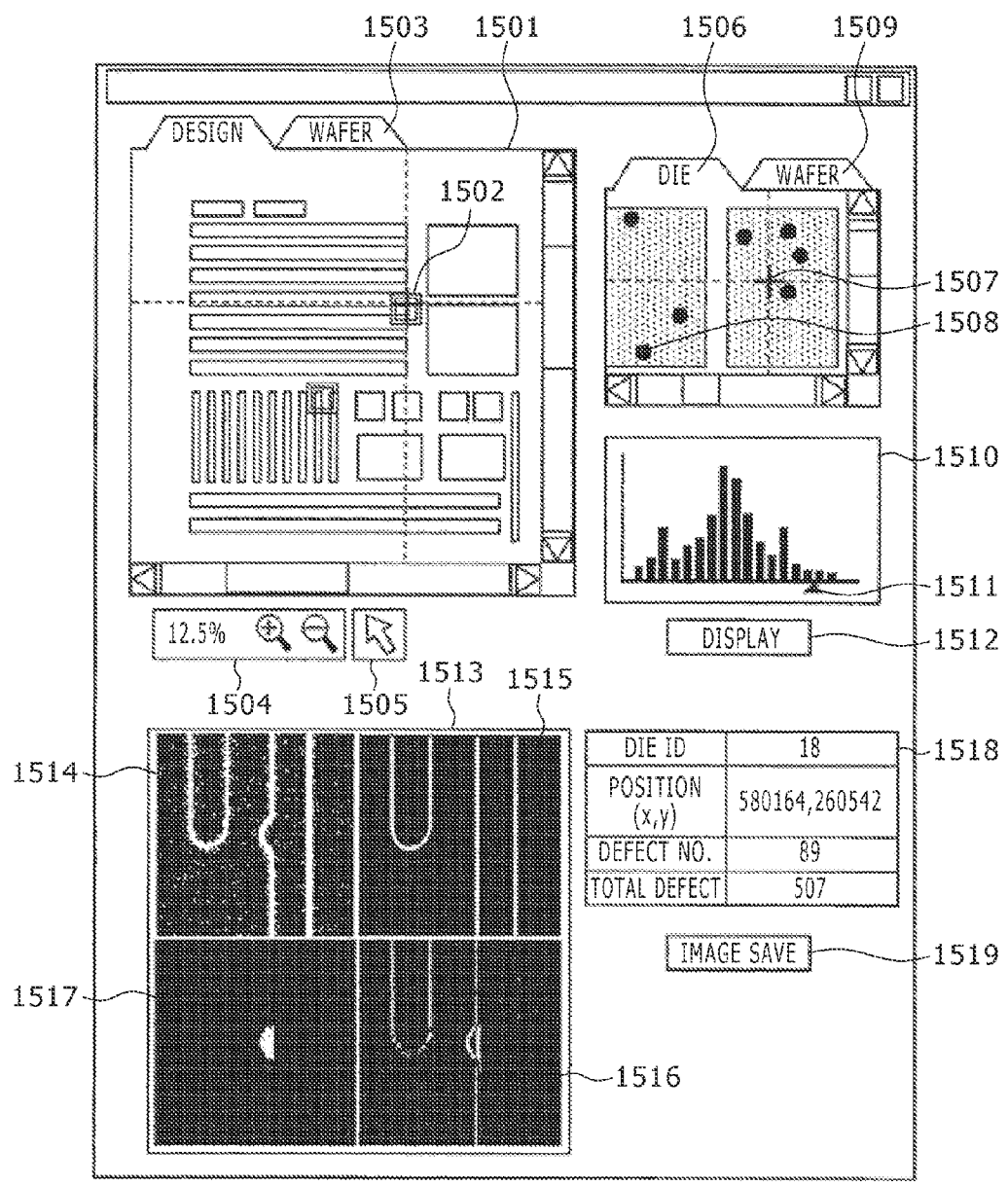
FIG. 14 is a view for describing a GUI for use in checking an inspection result, according to the first embodiment of the invention.

FIG. 14 is a view for describing a GUI for use in checking the result of defect-checking, according to the first embodiment of the invention.

A window 1501 displays a defect region 1502 as detected with a pattern image of the design data in the background. Further, the defect region can be displayed by selecting tab 1503 with an inspection image in the background. By selecting a zoom-in/zoom-out tool 1504, and clicking the same inside the window, a display magnification can be changed. Further, a select tool 1505 is selected to thereby select a defect inside the window, whereupon detailed information can be looked at. A window 1506 displays a die map. A position on the map selected by moving a cursor 1507 is reflected in the window 1501. Further, a defect-occurrence spot is displayed as a black point 1508 on the map. By selecting a tab 1509, a wafer map can be displayed from the die map. A window 1510 displays a luminance value before processing of the threshold of a defect image in a region displayed in the window 1501, as a histogram. Furthermore, the threshold can be altered using a slider 1511, and a result obtained using a newly set threshold can be displayed in the window 1501 by pressing a display button 1512. A detailed image of the defect selected in the window 1501 is displayed in a window 1513. An inspection image 1514 in the vicinity of the defect, a design data image 1515, a difference image 1516 between the inspection image and a pseudo SEM image, and a defect-detection region image 1517 are displayed in the window 1513, so that the defect can be checked in detail. Further, die No. of a die having a defect as selected, the coordinates of a defect, defect No, the total number of other defects as detected, and so forth are displayed in a window 1518. A defect image displayed in the window 1513 can be saved by pressing an image-save button 1519.

Second Embodiment

FIGS. 15A to 15E are views for describing an evaluation value by an edge orientation, according to a second embodiment of the invention.

The second embodiment of the invention differs from the first embodiment in that use is made of an edge amount by an edge orientation, calculated from a pattern interconnection in the design data, as one of the evaluation values calculated at the time of extracting the plural templates in the steps 102, 103, respectively, in FIG. 1.

Figure 15A:
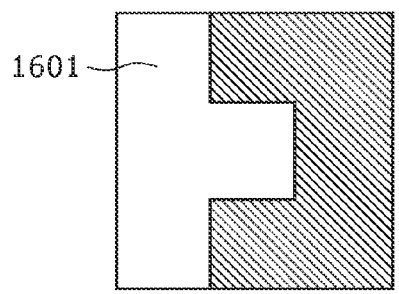
FIGS. 15A to 15E are views for describing an evaluation value by an edge orientation, according to a second embodiment of the invention.
Figure 15B:
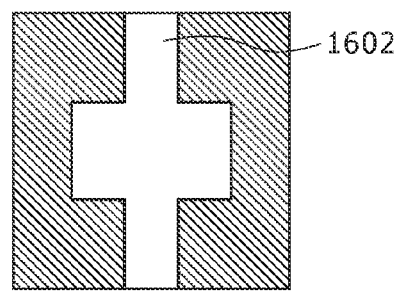
Figure 15C:
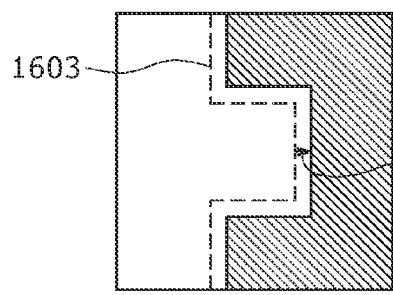

FIGS. 15A and 15B each show the design data, and regions 1601 and 1602 each indicate an interconnection region of a pattern on the design data. Further, FIG. 15C indicates a contour 1603 of the interconnection of the design data in FIG. 15A, superimposed on an actual image 1605. As the interconnection of the actual image has undergone expansion against the design data, if template-matching is executed such that the contour overlies the actual image, matching will be effected with the actual image being shifted in the direction of an arrow 1605.

Figure 15D:
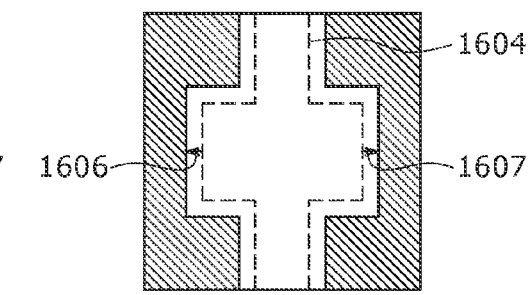

Similarly, FIG. 15D indicates a contour 1604 of the interconnection of the design data in FIG. 15B, superimposed on an actual image. In this case as well, the interconnection of the actual image has undergone expansion against the design data, so that if template-matching is executed such that a contour overlies the actual image, overlaying will be effected in the directions of respective arrows 1606 and 1607; however, since the arrows are oriented in the directions opposing each other, the risk that matching is effected such that the actual image is shifted unevenly in either direction will be reduced.

Accordingly, rather than the case where the orientation of the interconnection region toward a background region across a contour borderline is simply in one direction at the time of selecting a template region as shown in FIG. 15A, detection accuracy can be more enhanced by extraction of a partial region of the design data in the case where the orientation of the interconnection region can be in either direction as shown in FIG. 15B.

Figure 15E:
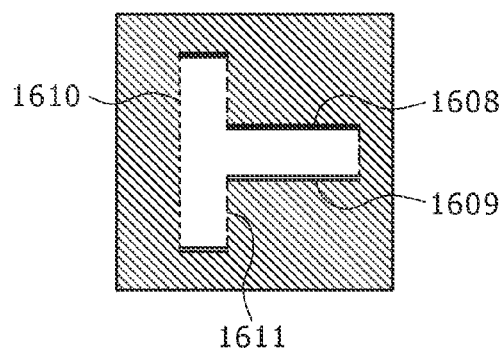

Now, an upward edge 1608 amount e1, a downward edge amount 1609 e2, a leftward edge 1610 e3, and a rightward edge 1611 e4 shown in FIG. 15E are each found, and an evaluation value Fe is found by the following formula (2.1):

$$F_e = 1 - \frac{(e_1 - e_2)^2 + (e_3 - e_4)^2}{(e_1 - e_2)^2 + (e_3 - e_4)^2} \quad (2.1)$$

The larger the evaluation value is, the more uniform the orientation of an edge is in either direction; therefore, the stability of matching can be ensured even in the case where expansion and degeneracy occur to the interconnections of the actual image.

Third Embodiment

FIGS. 16A to 16E are views for describing an evaluation value in the case where a transverse edge is present in the central part of a template, according to a third embodiment of the invention.

The third embodiment of the invention differs from the first embodiment in that use is made of an edge amount present in the vicinity of a template center (a reference point of registration) as one of the evaluation values calculated at the time of extracting the plural templates in the steps 102, 103, respectively, in FIG. 1.

Figure 16A:
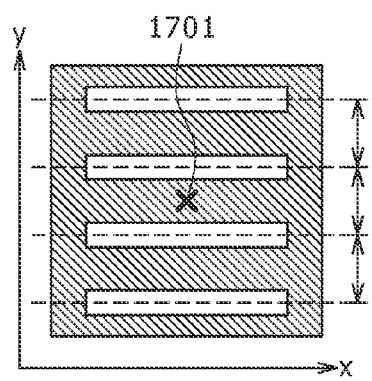
FIGS. 16A to 16E are views for describing an evaluation value in the case where a transverse edge is present in the central part of a template, according to a third embodiment of the invention.

FIG. 16A indicates a design data template where transverse interconnections are vertically arranged at equal intervals. With this template, registration is executed with the use of a center position 1701 as the reference point to thereby calculate a misregistration amount.

Figure 16B:
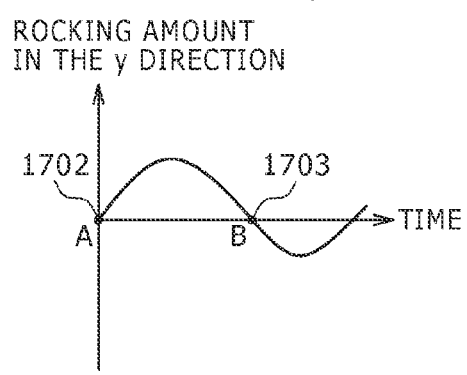
Figure 16C:
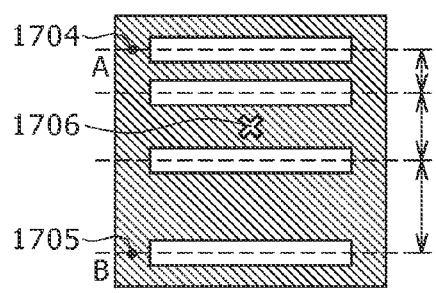

For example, in the case where a distortion in the y-direction of a graph shown in FIG. 16B is added to an image obtained by scanning in the x-direction in FIG. 16A with a beam, and scanning a stage in the y-direction, there is obtained an actual image with interconnections arranged at unequal intervals, as shown in FIG. 16C; provided that points 1702 and 1703 in the graph correspond to points 1704 and 1705 in FIG. 16C, respectively. In this case, a center position 1706 in an actual SEM image, corresponding to the center position 1701 of the design data, is shifted toward the point 1704.

Figure 16D:
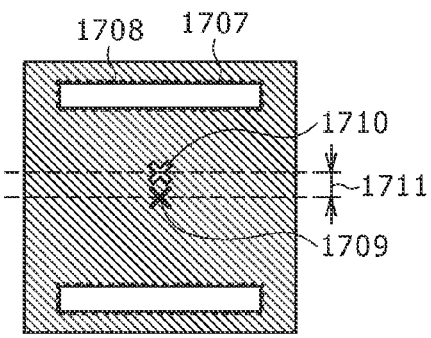

FIG. 16D indicates an example of another template image. Rocking of the stage shown in FIG. 16B is added to this template as well, and the design data is expressed by a solid line 1707 while the actual SEM image is expressed by a dotted line 1708. Further, a center 1710 of the actual SEM image, corresponding to a center 1709 of the design data, is expressed. In the case of this example, at the time of executing registration with the use of the contour of an interconnection, a distortion does not occur to the borderline of the contour in the actual SEM image, so that matching will be carried out without correction of a misregistration amount 1711 at a center position.

Figure 16E:
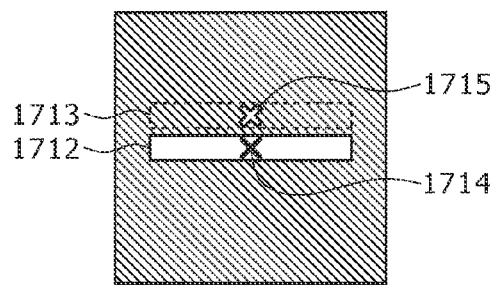

FIG. 16E indicates an example of still another template image. Rocking of the stage shown in FIG. 16B is added to this template as well, and the design data is expressed by a solid line 1712 while the actual SEM image is expressed by a dotted line 1713. Further, a center 1715 of the actual SEM image corresponding to a center 1714 of the design data is expressed. With this template, an interconnection is present in the vicinity of the center, so that misregistration attributable to a distortion caused by the rocking of the stage can be found by execution of matching with the use of the borderline of a contour. As shown in this example, an interconnection running in the direction (x) perpendicular to the stage-scanning direction (y) preferably exists in the vicinity of the center (a reference point at the time of registration) of the template against the rocking in the stage-scanning direction (y). Accordingly, if a y-coordinate of the center position is y0, and an edge intensity of an interconnection at coordinates (x, y), extended in the direction perpendicular (x) to the stage-scanning (y) direction is $e_h(x, y)$, $e_h(y)$ is given as follows:

$$e_h(y) = \sum_{x=0}^{width-1} e_h(x, y)$$

An evaluation value Fc of a transverse edge at the center is calculated by the following formula (3.1):

$$F_c = \sum_{y=0}^{height-1} \frac{e_h(y)}{1 + |y - y_0|} \quad (3.1)$$

where $$e_h(y) = \sum_{x=0}^{width-1} e_h(x, y),$$

width is a transverse region of a template, and height is a longitudinal region of the template. Even if a localized misregistration attributable to the rocking in the stage-scanning direction occurs, it is possible to workout this evaluation value, thereby extracting a template with which stable matching can be executed.

Fourth Embodiment

FIGS. 17A to 17E are views for describing an evaluation value in the case where symmetrical longitudinal edges exist, according to a fourth embodiment of the invention.

The fourth embodiment of the invention differs from the first embodiment in that use is made of edge amounts existing symmetrically about the center (the reference point of registration) of a template as one of evaluation values calculated at the time of extracting the plural templates in the steps 102, 103, respectively, in FIG. 1.

Figure 17A:
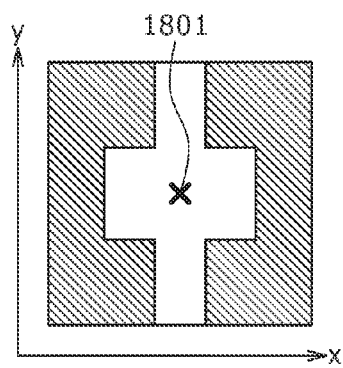
FIGS. 17A to 17E are views for describing an evaluation value in the case where symmetrical longitudinal edges exist, according to a fourth embodiment of the invention.
Figure 17B:
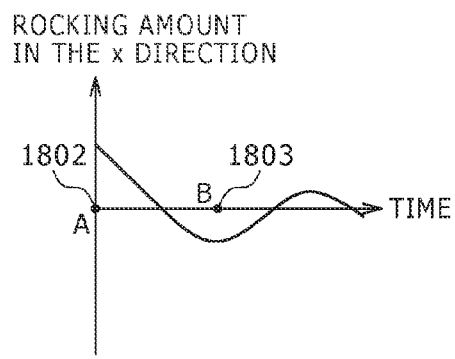
Figure 17C:
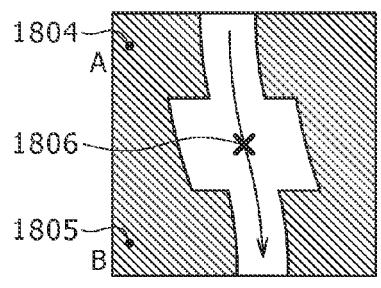
Figure 17D:
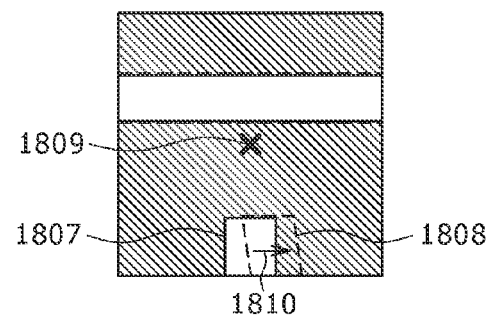

FIG. 17A indicates a design data template. With this template, registration is executed with the use of a center position 1801 as the reference point. In the case where a distortion in the x-direction of a graph shown in FIG. 17B is added to an image obtained by scanning in the x-direction in FIG. 17A with a beam, and scanning a stage in the y-direction, there is obtained an actual image with an interconnection in the longitudinal direction, distorted as if undulated, as shown in FIG. 17C. However, point A 1802, point B 1803 in the graph, correspond to point A 1804, point B 1805, respectively, in FIG. 17C when scanning is made with the electron beam. At this point in time, a center position of an SEM image, corresponding to the center position of the design data, is 1806. FIG. 17D indicates an example of another template image with rocking of the stage, shown in FIG. 17B, added thereto. The design data is expressed by a solid line 1807 while an actual SEM image is expressed by a dotted line 1808. The center of the design data and the center of the SEM image corresponding to the former are each the same point 1809. If matching is executed against this template on the basis of the borderline of a contour of the interconnection, the matching is carried out while the borderline is shifted in the direction of an arrow 1810, so that a center position will be shifted.

Figure 17E:
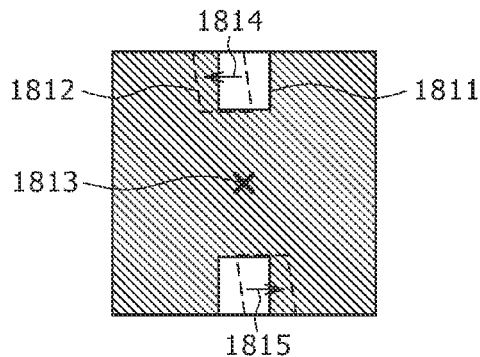

FIG. 17E indicates an example of still another template image with the rocking of the stage, shown in FIG. 17B, added thereto. The design data is expressed by a solid line 1811 while an actual SEM image is expressed by a dotted line 1812, and the center of the design data, and the center of the actual SEM image share a common point 1813. If matching is executed against this template on the basis of the borderline of a contour of the interconnection, this will cause matching to be effected in the direction of an arrow 1815 oriented in the direction opposite from the direction of an arrow 1814, so that the matching is finally implemented in a state where the center of the design data, and the center of the actual SEM image are aligned with each other. If edges in the longitudinal direction are present so as to be vertically symmetrical with reference to the reference point of registration, there will be reduction in the danger of occurrence of uneven matching, more in one direction, because of stacking up of positive, and negative directions in which moment to cause contour borderlines to be fitted to each other at the time of matching due to rocking of the stage in wavy state.

Accordingly, if symmetry of y-direction edges existing in the y-direction from the center of a template is defined as an evaluation value Fs, the evaluation value Fs is calculated by the following formula (4.1):

$$F_s = 1 - \left| \frac{\sum_{y=0}^{(height/2)-1} \sum_{x=0}^{width-1} e_v(x,y) - \sum_{y=height/2}^{height-1} \sum_{x=0}^{width-1} e_v(x,y)}{\sum_{y=0}^{height-1} \sum_{x=0}^{width-1} e_v(x,y)} \right| \quad (4.1)$$

where $e_v(x, y)$ is longitudinal edge intensity at coordinates (x, y), width is a transverse region of a template, and height is a longitudinal region of a template.

With the use of this evaluation value, it is possible to extract a template with which a misregistration amount can be found with stability even if misregistration occurs due to the rocking perpendicular to a stage-scanning direction.

Fifth Embodiment

A fifth embodiment of the invention is an embodiment whereby the misregistration amount found by the matching in not less than two stages according to the first embodiment is calculated by executing matching in decreasing order of template reliability.

Figure 19:
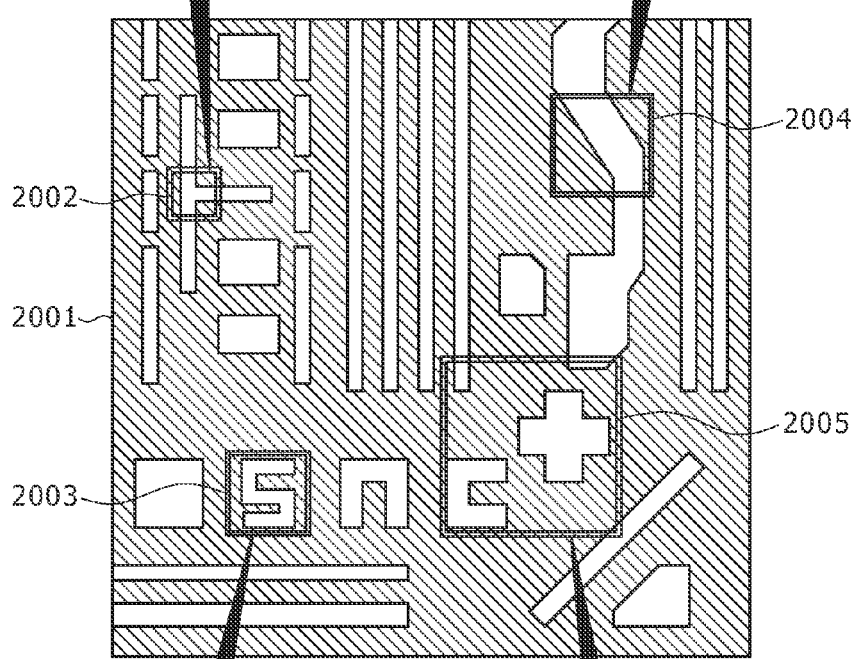
FIG. 19 is a view showing respective templates having reliability information, according to a fifth embodiment of the invention.

FIG. 19 is a view showing respective templates having reliability information, according to the fifth embodiment of the invention.

Templates extracted on design data 2001 are templates 2002, 2003, 2004, 2005, and so forth, each thereof being indicated by a double-line rectangle. These templates each have information on template coordinates 2006, edge amount 2007 as one of the evaluation values found under (1-4) according to the first embodiment, line width 2009, template size 2008, uniqueness 2010, matching reliability 2011, and so forth. The uniqueness is an index showing how unique the pattern shape of a template is as compared with a pattern in the vicinity thereof.

As is the case with the uniqueness search scope described under (1-2) according to the first embodiment, the evaluation value f5 according to the formula (1.2) is calculated in s search scope set by the user from a template image, and a uniqueness evaluation value fu is calculated from the maximum value fmax of f5 at coordinates excluding the same coordinates as those of the template image by the following formula (6.1):

$$f_u = 1 - f_{max} \quad (6.1)$$

where $f_u$ has a value in a range of 0.0 to 1.0, and the greater a value $f_u$ is, the more unique the template is in the search scope. For the extraction of such templates having various template sizes as shown in FIG. 19, use is made of a technique for extracting a feature point, so-called SIFT feature point (Reference Literature; "Distinctive image features fromscale-invariant keypoints" by David G. Lowe, Journal of Computer Vision, 60, 2, pp. 91-110, 2004). As for this feature point, magnitude of the feature point, called scale, is defined. The scale is for use in representing a template size. Template candidates having various template sizes are extracted using the technique for extracting the SIFT feature point, and a template for use in matching is selected from among the evaluation values 2007, 2009, 2010, and so forth. The search scope for use in finding uniqueness evaluation value 2010 is decided so as to be proportional to a template size. For example, a parameter "n" is defined by a user, and a rectangular region having one side, being n-fold as large as a template size, is defined as a search scope to thereby evaluate uniqueness.

The present embodiment has a feature in that template registration is executed in descending order of the matching reliability 2011 of the template, that is, in the order of 2005, 2004, 203, and 2002. The matching reliability is calculated from an evaluation value found for template extraction using the weighted addition formula (1.3). In the case of an example shown in FIG. 19, calculation is made by applying a large weight to an evaluation value relating to matching stability, such as line width, uniqueness, and so forth.

At the time of matching a template, a rough misregistration amount is calculated from a template having completed matching, located in the vicinity of the template, and subsequently, template-matching is executed with the use of a reference point found by correcting the rough misregistration amount as starting point. By so doing, corrections are sequentially made starting from large misregistration, so that a matching search scope is gradually reduced, whereupon the danger of matching failure, and a calculation amount for matching can be reduced.

Figure 20:
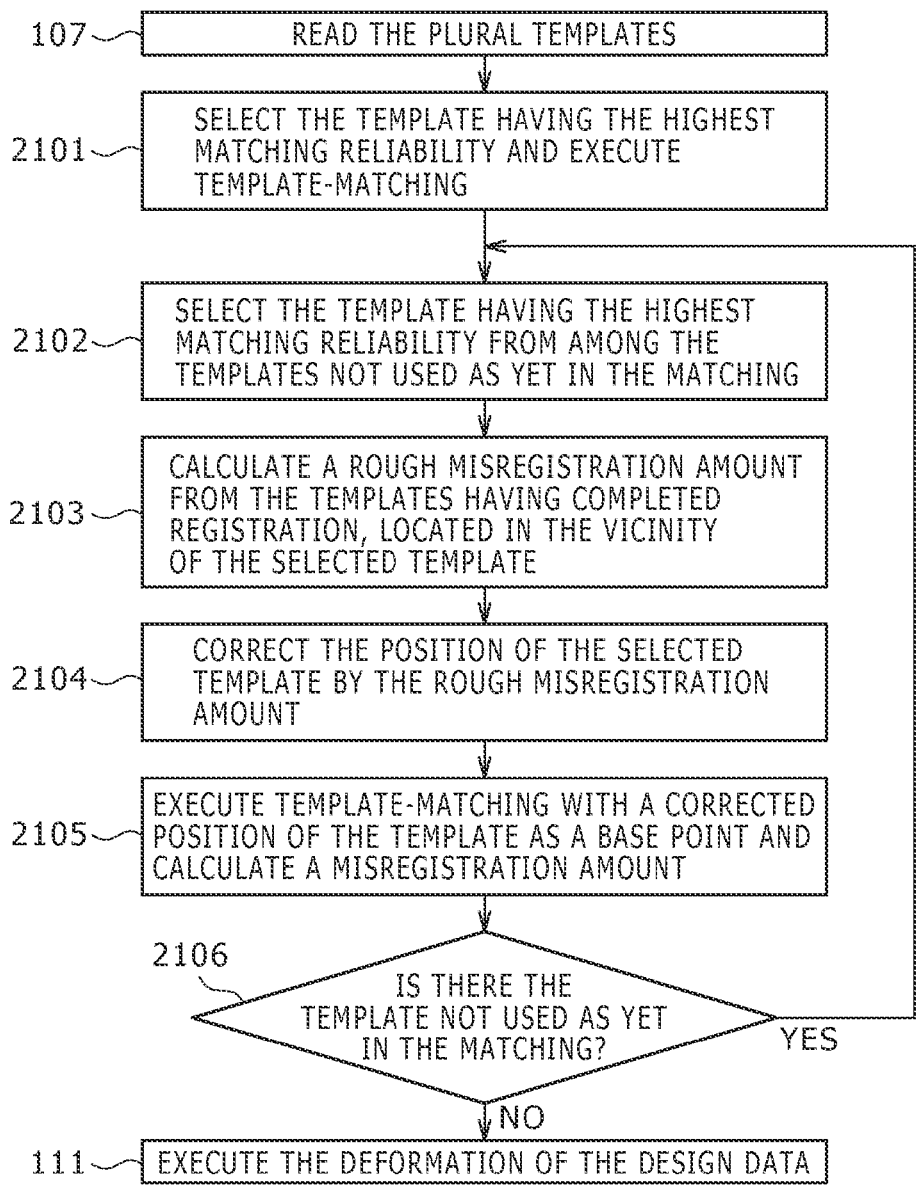
FIG. 20 is a view showing a flow of matching process executed in decreasing order of the template reliability, according to the fifth embodiment of the invention.

FIG. 20 is a view showing a flow of a matching process executed in decreasing order of the template reliability, according to the fifth embodiment of the invention. The flow is identical to the flow of FIG. 1 up to the step 107 before the start of the matching, omitting therefore description thereof. After the plural templates are read (the step 107), the template having the highest matching reliability is selected to execute template-matching with the use of the maximum misregistration amount that can occur as a search scope (step 2101). Subsequently, the template having the highest matching reliability is selected from among the templates not used as yet in the matching (step 2102). A rough misregistration amount is calculated by interpolating a misregistration amount from the templates having completed registration, located in the vicinity of the selected template (step 2103). More specifically, a rough misregistration amount D is found using Shepard-interpolation used in (1-7) according to the first embodiment, centering around the selected template. Nest, the position of the selected template is corrected by the rough misregistration amount D (step 2104). Template-matching is executed with the use of the corrected position as a (reference) base point (step 2105). At this point in time, if a distance to the template having completed registration, served as a base for interpolation to find the rough misregistration amount D, is found short, it is considered that the rough misregistration amount D is high in accuracy, so that a search scope for matching can be narrowed down. Assuming that one side of a search scope for an initial matching for use in the step 2101 is "m" in length, and a distance between a template intended for matching and the nearest template having completed matching is "l", a length m' of one side of a search scope for matching of a template in the middle of selection is calculated by the following formula (6.2):

$$m' = \frac{m}{2\pi} \tan^{-1} \frac{l}{\alpha} \quad (6.2)$$

In this case, $\alpha$ is a normalized parameter of a distance, decided by a user. Matching is executed in a search scope as found, thereby working out a misregistration amount of the matching as selected. If another template having not completed matching as yet is found after the matching described as above, the processing reverts to the step 2102, and if all the templates have completed matching, the process proceeds to the step 111 in FIG. 1 to thereby execute deformation of the design data.

With the present embodiment, the matching is executed in decreasing order of the template reliability, so that a misregistration amount can be accurately calculated, thereby enabling highly accurate matching to be implemented.

Sixth Embodiment

A sixth embodiment of the invention is an embodiment whereby a margin as the shortest distance between templates adjacent to each other is set as a parameter to thereby adjust the number of templates that are extracted.

Figure 21:
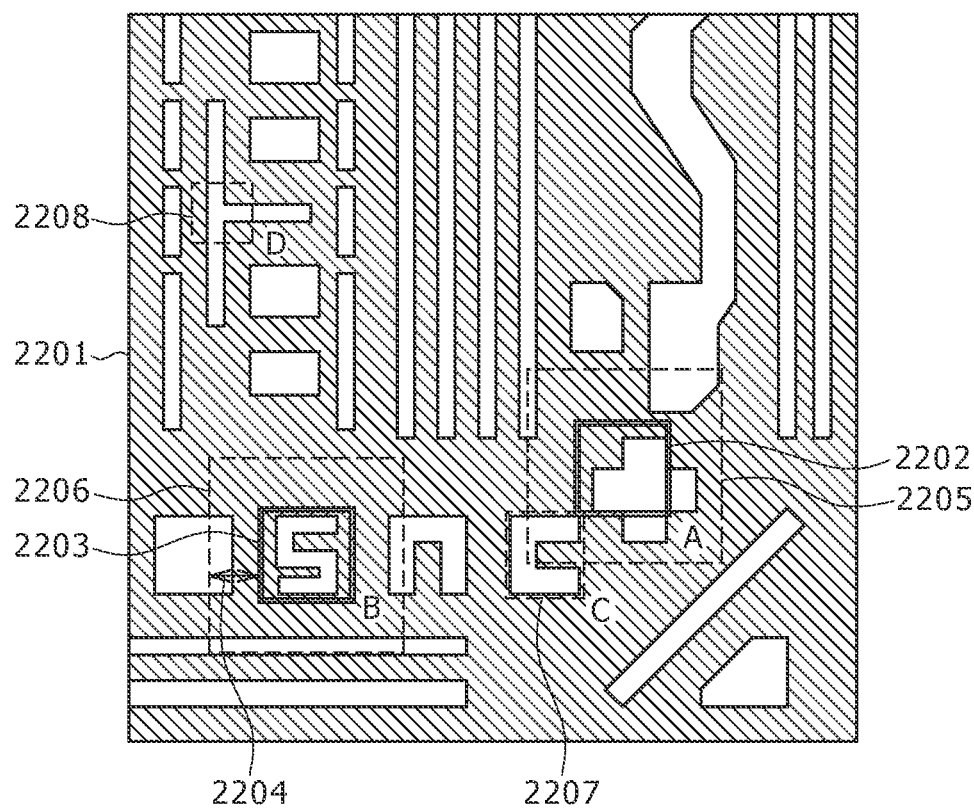
FIG. 21 is a view for describing a process for adjusting the number of templates extracted using a margin, according to a sixth embodiment of the invention.

FIG. 21 is a view for describing a process for adjusting the number of templates extracted using a margin, according to the sixth embodiment of the invention.

As described under (1-4) in the first embodiment, respective pixels of the design image are adopted as template candidates in design data 2201, and templates are sequentially decided in decreasing order of an evaluation value starting from the candidate having a high evaluation value. Supposing that an overall evaluation value F is high in the order of template candidates A2202, B2203, C2207, and D2208, a template is extracted in the order of A, B, the candidates higher in the overall evaluation value, provided that the order of selecting the template is not specified. At this pint in time, if selection is made in decreasing order of the overall evaluation value in the case where template-extraction unable-regions 2205, 2206 each are defined by a margin 2204 that is the shortest distance between the templates adjacent to each other, as a parameter set by a user, the template C is to be selected after the template B, however, the template C cannot be extracted because it is located in the template-extraction unable-regions 2205 of the template A, so that the template D located off the template-extraction unable-regions will be extracted. Template extraction from among the template candidates is repeatedly executed, to be continued until a template can no longer be extracted from among the template candidates. The user can reduce the number of templates to be extracted by increasing a parameter value of the margin, while conversely increasing the number of templates to be extracted by decreasing the parameter value, thereby adjusting the number of templates to be extracted.

Seventh Embodiment

A seventh embodiment of the invention is an embodiment whereby a review inspection of a defect is executed using template registration in two stages.

The review inspection is an inspection for observing the position of a defect detected in a defect-inspection in an optical inspection apparatus, and so forth, using a high-resolution optical system such as an SEM inspection apparatus, and so forth. On the basis of information on the shape of a defect in detail, and a defect-occurrence spot on the design data, found by the SEM inspection apparatus, it is possible to analyze what cause in a semiconductor manufacturing process is responsible for the defect that has occurred.

Figure 22:
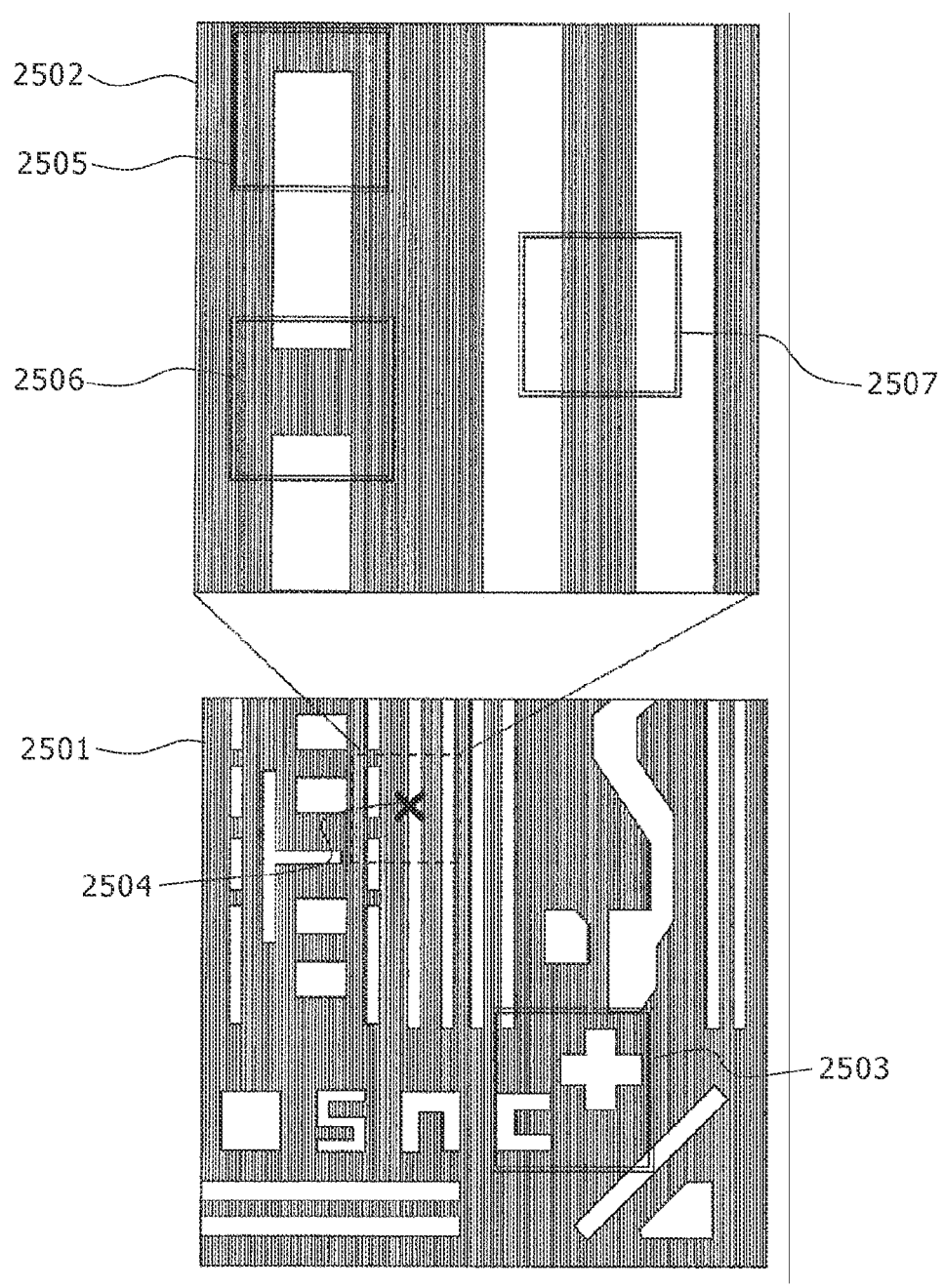
FIG. 22 is a view for describing a template-matching method for images in a range of a low-magnification image to a high-magnification image, according to a seventh embodiment of the invention.

FIG. 22 is a view for describing a template-matching method in a range of a low-magnification image to a high-magnification image, according to the seventh embodiment of the invention.

In the review inspection, a stage is moved such that a region of a wafer to be observed will be at the center of the optical system to be subsequently stopped. However, in reality, a gap occurs between coordinates on top of the wafer, corresponding to the center of the optical system, and coordinates of an image to be picked up. For this reason, design data 2501, in the vicinity of the coordinates of a defect to be observed, is cut out, and a template 2503 for use in first-time registration is extracted. Further, a template for use in second-time registration is also extracted against all design-data regions, as cut out. The electron optical system picks up a low-magnification image from the wafer, and executes matching using this image, and the template for use in the first-time registration to find a misregistration amount, thereby executing coordinates-correction. Subsequently, the electron optical system acquires a high-magnification image at coordinates 2504 to be observed from the corrected coordinate on top of the wafer. Matching is executed using the high-magnification image as acquired, and templates 2505, 2506, 2507, in design data 2502, corresponding to the region of the image to thereby find a misregistration amount in a localized region. Deformation of the design data is executed using this misregistration amount, as is the case with the first embodiment. The design data as deformed is compared with an actual pattern image to thereby analyze a defect position, and the type of a defect.

Figure 23:
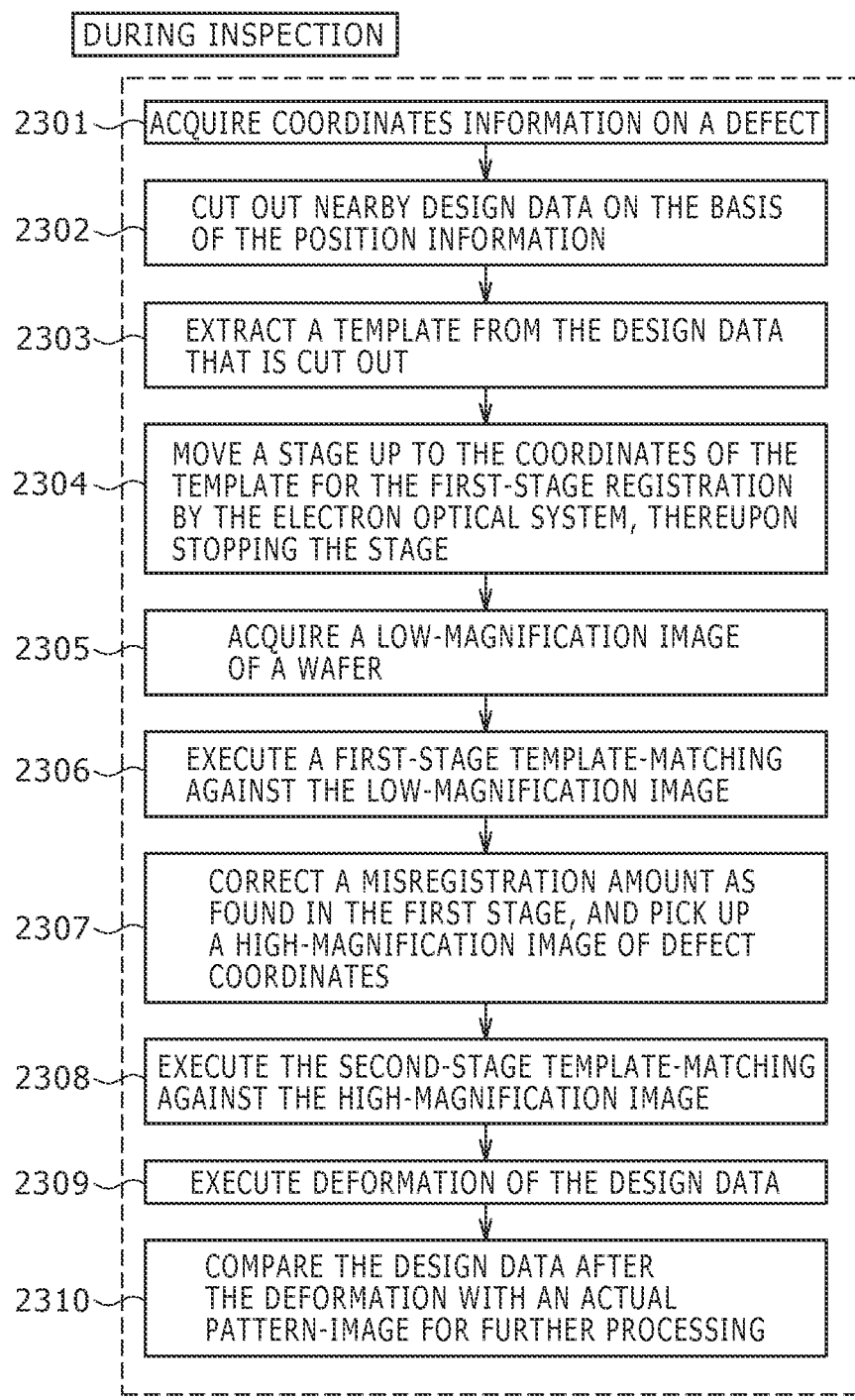
FIG. 23 is a view showing a flow of a two-stage registration process using templates in the review inspection, according to the seventh embodiment of the invention.

FIG. 23 is a view showing a flow of a two-stage registration process using templates in the review inspection, according to the seventh embodiment of the invention.

First, position information on the top of a wafer under observation is acquired from the result of defect-detection by the optical inspection apparatus (step 2301). On the basis of coordinates information as acquired, design data in a region in the vicinity of coordinates thereof is cut out (step 2302). Template-extraction is executed against the design data that is cut out, as is the case with the first embodiment (step 2303). A stage of the SEM inspection apparatus is moved up to the coordinates of the template for the first-stage registration, whereupon the stage is stopped (step 2304). The electron optical system acquires a low-magnification image of a wafer (step 2305). A first-stage template-matching is executed against the low-magnification image, thereby working out a misregistration amount between an actual image and the design data (step 2306). The coordinates information on the wafer at the present position of the stage is corrected from the misregistration amount as found, and a high-magnification image of defect coordinates is picked up (step 2307). A second-stage template-matching is executed against the high-magnification image as obtained to thereby calculate a localized misregistration amount (step 2308). Deformation of the design data is executed on the basis of this misregistration amount as is the case with the first embodiment (step 2309). The design data after the deformation is compared with a high-magnification actual pattern-image to thereby analyze the detailed position of a defect, and a defect shape (step 2310). If a defect to be observed is left out, the process reverts to the step 2304 to continue the inspection.

Eighth Embodiment

An eighth embodiment of the invention is an embodiment whereby a fixed-point inspection of semiconductor is executed using template registration in the two stages.

The fixed-point inspection is an inspection whereby a wafer is periodically sampled, and an image of a hot spot (spot susceptible to defect-occurrence) obtained in a process simulation, or an image of a defect-prone spot known from inspections in the past is picked up, thereby checking whether or not a problem has arisen through observation of a state of the wafer. As is the case with the seventh embodiment, image acquisition analysis are executed in a flow including acquisition of the low-magnification image, position correction by the first stage template-matching, and acquisition of the high-magnification image by the second-stage template-matching. The eighth embodiment of the invention differs from the seventh embodiment in that because regions to be observed are provided for prior to the inspection, the templates can be extracted prior to the inspection.

Figure 24:
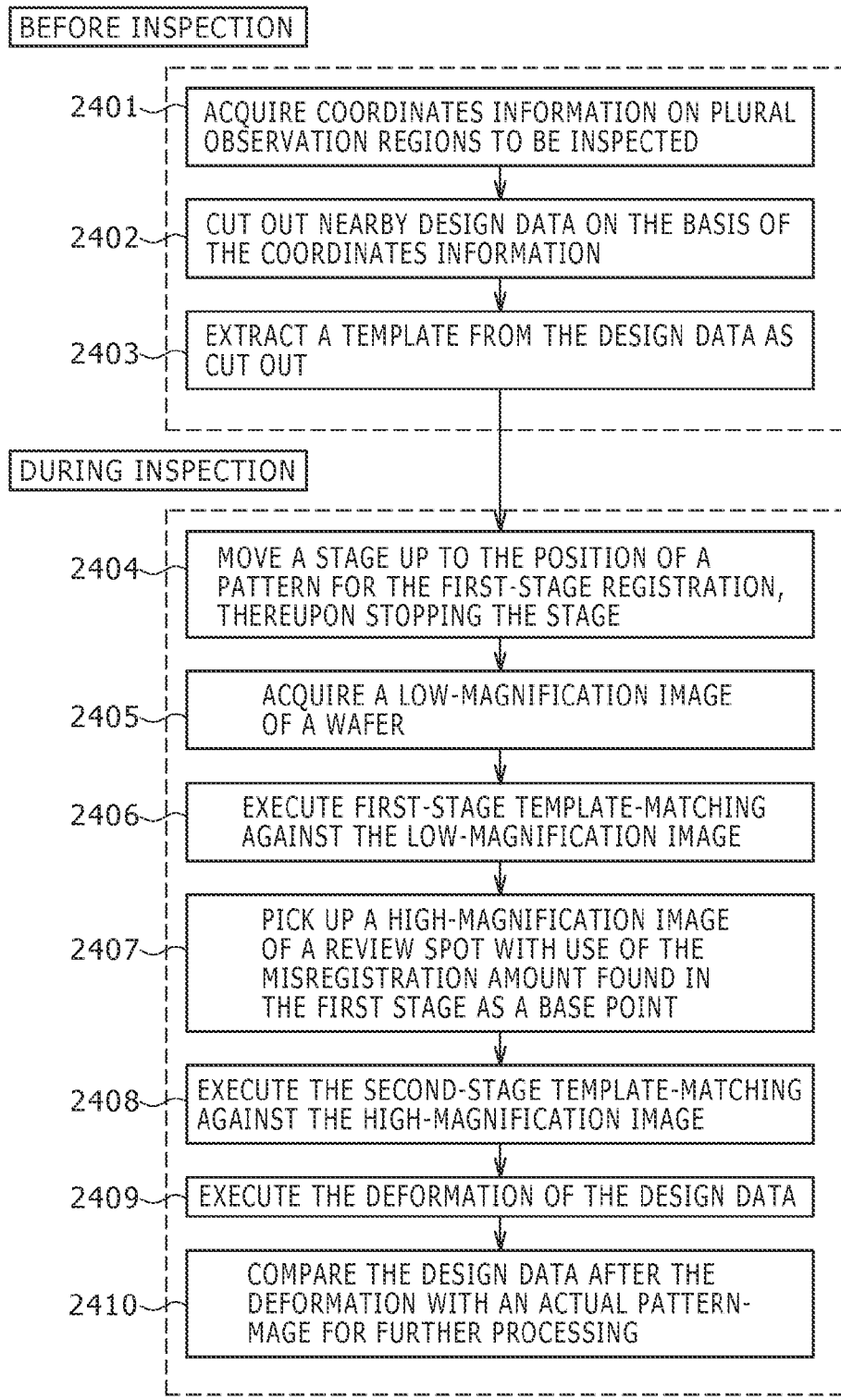
FIG. 24 is a view showing a flow of a two-stage registration process using templates in a fixed-point inspection, according to the eighth embodiment of the invention.

FIG. 24 is a view showing the flow of a two-stage registration process using templates in the fixed-point inspection, according to the eighth embodiment of the invention.

First, before inspection, a spot on a wafer, susceptible to defect-occurrence, and a spot on a wafer, that will be vitally affected, if a defect occurs, are found by analysis of the design data to thereby acquire coordinates information on plural observation regions to be inspected (step 2401). On the basis of coordinates acquired, the design data in a region in the vicinity of the coordinates is cut out (step 2402). Template-extraction from the design data as cut out is executed as is the case with the first embodiment (step 2403). During the inspection, the stage of the SEM inspection apparatus is moved up to the coordinates of the template for the first-stage registration, in an observation target region, thereupon stopping the stage (step 2404). The electron optical system acquires a low-magnification image of a wafer (step 2405). Matching with the template for the first-stage registration is executed against the low-magnification image as acquired to calculate a misregistration amount between an actual image and the design data (step 2406). Coordinates information on the wafer at the present position of the stage is corrected from the misregistration amount as found, and a high-magnification image of the observation region is picked up (step 2407). A second-stage template-matching is executed against the high-magnification image to calculate a localized misregistration amount (step 2408). Deformation of the design data is executed on the basis of this misregistration amount as is the case with the first embodiment (step 2409). The design data after the deformation is compared with a high-magnification actual pattern-image to thereby detect a defect, and analyze a pattern state (step 2410). If a region to be observed is left out, the process reverts to the step 2404 to continue the inspection.

Ninth Embodiment

A ninth embodiment of the invention is an embodiment whereby an actual image acquired by stopping a stage is compared with design data using template registration in not less than two stages to thereby execute defect-determination.

Figure 25:
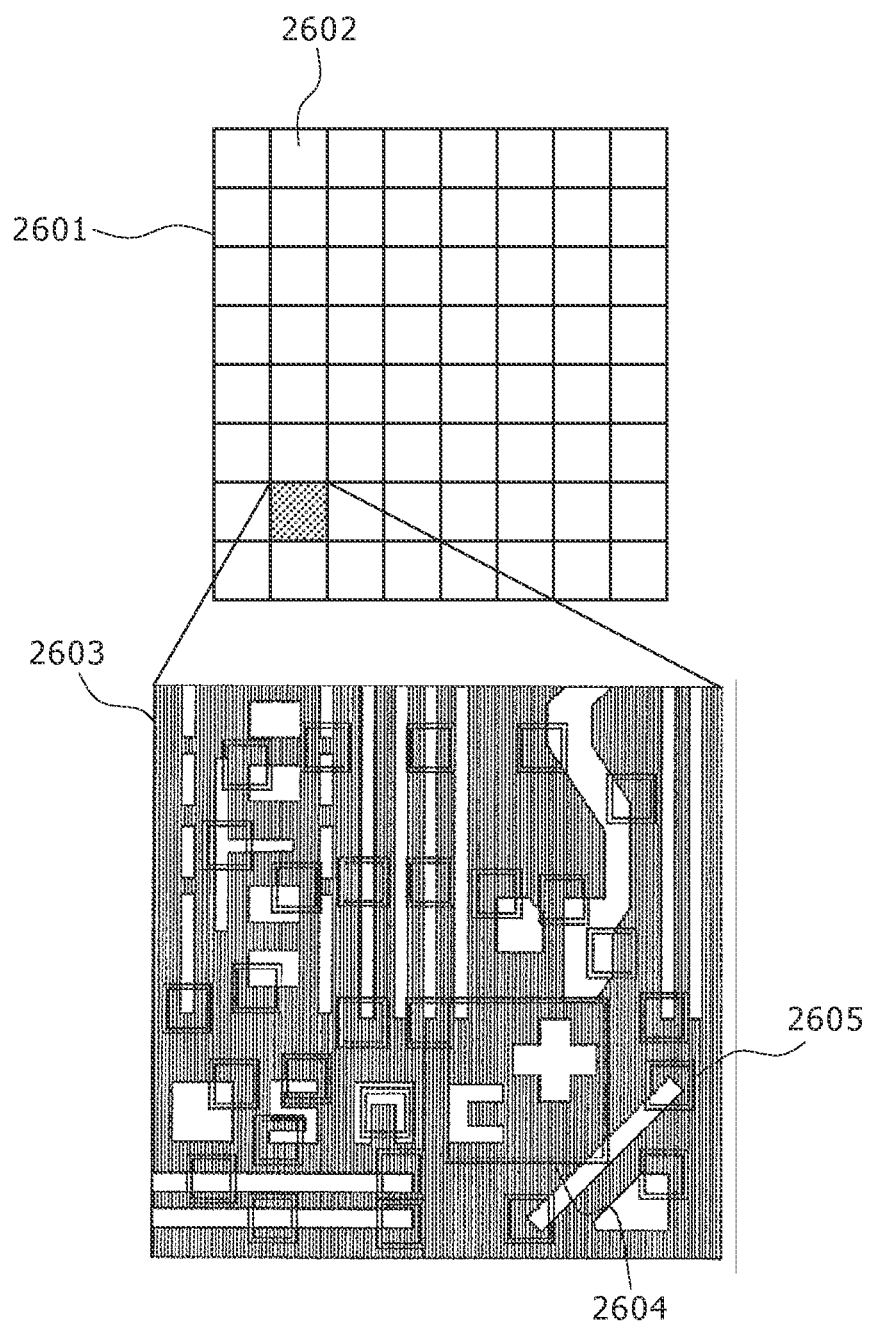
FIG. 25 is a view for describing a two-stage registration process using templates in an SEM image acquired by stopping a stage, according to a ninth embodiment.

FIG. 25 is a view for describing a process for two-stage registration using a template in an SEM image, acquired by stopping a stage, according to the ninth embodiment.

A stage is moved up to an inspection region to be stopped there, and an image is acquired simply by deflection of an electron beam. At this point in time, an actual image can be acquired only in a region 2601 by controlling a deflection lens, and an objective lens. A small region 2602 indicates a scope where an actual image can be acquired upon scanning with a beam by controlling the deflection lens, and respective images in the small regions throughout the region 2601 are acquired one by one by controlling the objective lens. At the time of executing registration between an actual image acquired and design data, a length of one side of the array size for extracting the template used under (1-4) of the first embodiment is set to half the length of one side of the small region 2602 such that one template for the first-stage registration is present in the small region without fail. With the use of a template 2604 for the first-stage registration, overall registration is carried out, and with the use of a template 2605 for registration in the second-stage, or later, a localized misregistration amount is calculated to thereby deform the design data. An actual image is compared with the design data after deformation, thereby executing defect detection.

Tenth Embodiment

A tenth embodiment of the invention is an embodiment whereby defect determination is made from an image of an actual image acquired in an operation carried out by diagonally slanting the electron beam against the stage-scanning direction in the first embodiment.

With the first embodiment, the beam scanning direction of the SEM inspection apparatus may be either perpendicular, or unperpendicular against the stage-scanning direction. In the case of a semiconductor pattern, a main interconnection direction is often designed to be perpendicular to, or parallel with the stage-scanning direction. If an actual image is acquired by the SEM inspection apparatus in the case of the beam scanning direction being perpendicular to the stage-scanning direction, continuous emission of secondary electrons is kept in portions of the contour of interconnections running in a direction perpendicular to the stage-scanning direction (parallel with the beam scanning direction), so that electrostatic charging occurs to a wafer. When electrostatic charge increases, the secondary electrons are no longer emitted, whereupon the contour of the interconnection of the actual image becomes blurred, and the actual image, the contour of which is lost, is created. If the borderline of the contour is lost, a correlation value in matching with the template for use in registration will become smaller, and a result will be unstable. Accordingly, scanning with the beam is carried out so as not to be in the direction parallel with the interconnection direction as much as possible to thereby acquire an actual image.

Figure 26:
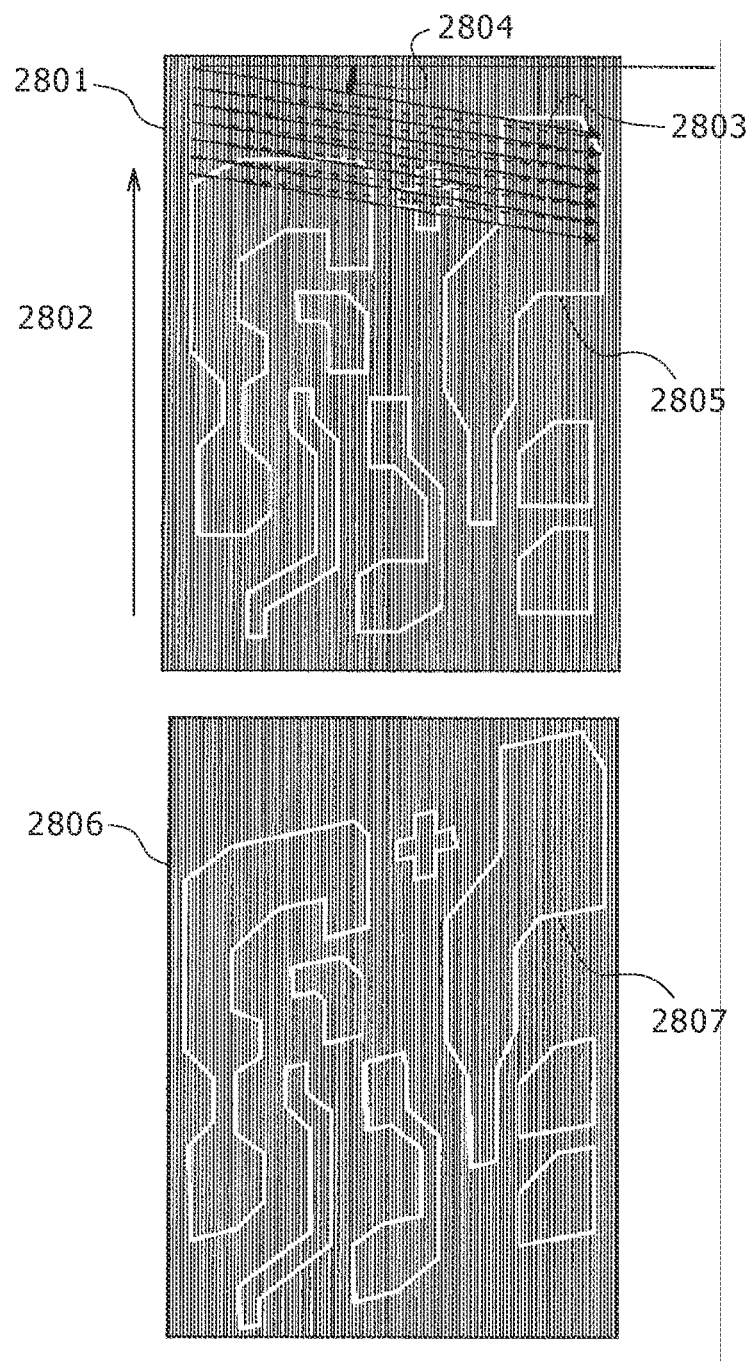
FIG. 26 is a view for describing a diagonally-slanted scanning process by beam-scanning, according to a tenth embodiment of the invention.

FIG. 26 is a view for describing a diagonally-slanted scanning process by beam scanning, according to the tenth embodiment of the invention. In FIG. 26, a stage is scanned in the direction of an arrow 2802 against an interconnection pattern 2801. At this point in time, beam scanning is executed in the direction of an arrow 2803 forming an angle θ (2804) with a line perpendicular to the stage-scanning direction. As a result, an actual image obtained will be a picture 2806. A contour 2805 of interconnections running in the direction perpendicular to the stage-scanning direction is acquired in a slanted form like a contour 2807, so that the effects of electrostatic charging is lessened, and loss or blurring of the contour is lessened. Further, at the time of executing the matching with the template for use in registration, it need only be sufficient to cut out an image after drawing an image with diagonally slanted deformation added thereto at the time of cutting out the template image from the design data A vertex (x', y') of the design data after deformed so as to cope with the diagonally-slanted scanning against the vertex (x, y) of the design data before imaging is given as follows:

$$x' = x$$

$$y' = (x - x_0)\tan\theta$$

where $x_0$ is the x-coordinate of a starting point of the beam scanning when an actual image is acquired.

The ten embodiments are described as above. With the present invention, the misregistration between the inspection image and the design data can be corrected, and the position of the interconnection pattern in whole can be coped with, whereupon highly accurate defect-inspection is realized by comparison with the design data. It is to be understood that an embodiment of the invention is not limited to the respective embodiments described in the foregoing and that parts or all of the respective embodiments may be combined with each other.

What is claimed is:

1. A defect inspection method comprising:
   an inspection image acquisition step to pick up an image of a subject under inspection to thereby acquire an inspection image;
   a template extraction step to extract a plurality of templates corresponding to a plurality of regions, respectively from design data of the subject under inspection;
   a first misregistration-amount calculating step to find the first misregistration-amount between the inspection image and the design data using a first template as any one template selected from among the plural templates;
   a second misregistration-amount calculating step to find the second misregistration-amount between the inspection image and the design data using a second template other than the first template, the second template being selected from among the plural templates, and the first misregistration-amount; and
   a defect-inspection step to convert the design data, misregistration thereof being corrected using the first misregistration-amount, and the second misregistration-amount, into a design data image, and to compare the design data image with the inspection image to thereby detect a defect of the subject under inspection.

2. The defect inspection method according to claim 1, wherein the plural templates differing in template size from each other are extracted in the template extraction step.

3. The defect inspection method according to claim 1, wherein the first template is larger in template size than the second template.

4. The defect inspection method according to claim 1, wherein a plurality of the second templates are provided.

5. The defect inspection method according to claim 1, wherein a misregistration amount common to the inspection image in whole is calculated in the first misregistration-amount calculating step, and a localized misregistration amount of the inspection image is calculated in the second misregistration-amount calculating step.

6. The defect inspection method according to claim 1, wherein the first template is higher in template reliability than the second template.

7. The defect inspection method according to claim 1, wherein the plurality of templates are extracted with the use of a correlation degree between an image of a predetermined region of the design data and an image of a region in the vicinity of the predetermined region of the design data in the template extraction step.

8. The defect inspection method according to claim 1, wherein the first misregistration-amount calculating step, and the second misregistration-amount calculating step each find a misregistration-amount with respect to the same region.

9. A defect inspection apparatus comprising:
   an inspection image acquisition unit to pick up an image of a subject under inspection to thereby acquire an inspection image;
   a template extraction unit to extract a plurality of templates corresponding to a plurality of regions, respectively from design data of the subject under inspection;
   a matching unit including a first misregistration-amount calculating sub-unit to find the first misregistration-amount between the inspection image and the design data using a first template as any one template selected from among the plurality of templates, and a second misregistration-amount calculating sub-unit to find the second misregistration-amount between the inspection image and the design data using a second template other than the first template, the second template being selected from among the plural templates, and the first misregistration-amount; and
   a defect-inspection unit to convert the design data, misregistration thereof being corrected using the first misregistration-amount, and the second misregistration-amount, into a design data image, and to compare the design data image with the inspection image to thereby detect a defect of the subject under inspection.

10. The defect inspection apparatus according to claim 9, wherein the plural templates differing in template size from each other are extracted by the template extraction unit.

11. The defect inspection apparatus according to claim 9, wherein the first template is larger in template size than the second template.

12. The defect inspection apparatus according to claim 9, wherein a plurality of the second templates are provided.

13. The defect inspection apparatus according to claim 9, wherein a misregistration amount common to the inspection image in whole is calculated by the first misregistration-amount calculating unit, and a localized misregistration amount of the inspection image is calculated by the second misregistration-amount calculating unit.

14. The defect inspection apparatus according to claim 9, wherein the first template is higher in template reliability than the second template.

15. The defect inspection apparatus according to claim 9, wherein the plural templates are extracted with the use of a correlation degree between an image of a predetermined region of the design data and an image of a region in the vicinity of the predetermined region of the design data by the template extraction unit.

16. The defect inspection apparatus according to claim 9, wherein the first misregistration-amount calculating unit, and the second misregistration-amount calculating unit each find a misregistration-amount with respect to the same region.

17. A defect inspection method comprising:
   an inspection image acquisition step to pick up an image of a subject under inspection to thereby acquire an inspection image;
   a template extraction step to extract a plurality of templates corresponding to a plurality of regions, respectively from design data of the subject under inspection;
   a misregistration-amount calculating step to find a misregistration-amount between the inspection image and the design data plural times using the plurality of templates; and
   a defect-inspection step to convert the design data, misregistration thereof being corrected using a plurality of misregistration-amounts found by the misregistration-amount calculating step, into a design data image, and to compare the design data image with the inspection image to thereby detect a defect of the subject under inspection.

18. A defect inspection apparatus comprising:
   an inspection image acquisition unit to pick up an image of a subject under inspection to thereby acquire an inspection image;
   a template extraction unit to extract a plurality of templates corresponding to a plurality of regions, respectively from design data of the subject under inspection;

a misregistration-amount calculating unit to find a misregistration amount between the inspection image and the design data multiple times using the plurality of templates; and a defect-inspection unit to convert the design data, misregistration thereof being corrected using a plurality of misregistration amounts found by the misregistration-amount calculating unit, into a design data image and to compare the design data image with the inspection image to thereby detect a defect of the subject under inspection.

* * * * *